United States Patent
Lim et al.

(10) Patent No.: US 9,794,811 B2
(45) Date of Patent: Oct. 17, 2017

(54) CELL MEASURING METHOD AND INFORMATION TRANSMITTING METHOD THEREFOR

(75) Inventors: Suhwan Lim, Anyang-si (KR); Manyoung Jung, Anyang-si (KR); Yoonoh Yang, Anyang-si (KR); Sangwook Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 678 days.

(21) Appl. No.: 14/233,620

(22) PCT Filed: Jun. 13, 2012

(86) PCT No.: PCT/KR2012/004654
§ 371 (c)(1),
(2), (4) Date: Jan. 17, 2014

(87) PCT Pub. No.: WO2013/018990
PCT Pub. Date: Feb. 7, 2013

(65) Prior Publication Data
US 2014/0192671 A1    Jul. 10, 2014

Related U.S. Application Data

(60) Provisional application No. 61/512,921, filed on Jul. 29, 2011, provisional application No. 61/532,574, filed on Sep. 9, 2011.

(51) Int. Cl.
| | | |
|---|---|---|
| *H04J 1/16* | (2006.01) | |
| *H04W 24/08* | (2009.01) | |
| *H04W 24/10* | (2009.01) | |
| *H04W 48/16* | (2009.01) | |
| *H04L 5/00* | (2006.01) | |

(52) U.S. Cl.
CPC ............ *H04W 24/08* (2013.01); *H04L 5/005* (2013.01); *H04L 5/0094* (2013.01); *H04L 5/001* (2013.01); *H04L 5/0023* (2013.01); *H04L 5/0073* (2013.01); *H04L 5/0082* (2013.01); *H04W 24/10* (2013.01); *H04W 48/16* (2013.01)

(58) Field of Classification Search
CPC ..... H04L 5/0023; H04L 5/005; H04L 5/0094; H04W 24/10; H04W 48/16
See application file for complete search history.

(56) References Cited

U.S. PATENT DOCUMENTS

| | | | |
|---|---|---|---|
| 2010/0027502 A1* | 2/2010 | Chen .................... | H04L 5/0007 370/330 |
| 2010/0315963 A1 | 12/2010 | Jading et al. | |
| 2011/0116437 A1 | 5/2011 | Chen et al. | |
| 2011/0205951 A1 | 8/2011 | Lee et al. | |
| 2012/0099462 A1 | 4/2012 | Yuda et al. | |
| 2012/0231790 A1* | 9/2012 | Lindoff ................ | H04W 48/16 455/434 |
| 2012/0275322 A1* | 11/2012 | Ji ......................... | H04L 1/0027 370/252 |
| 2013/0003578 A1* | 1/2013 | Hu ....................... | H04W 24/00 370/252 |
| 2014/0064133 A1* | 3/2014 | Kazmi ................. | H04W 24/10 370/252 |

FOREIGN PATENT DOCUMENTS

| | | |
|---|---|---|
| KR | 10-2010-0036212 A | 4/2010 |
| WO | WO 2010/143445 A1 | 12/2010 |

* cited by examiner

*Primary Examiner* — Charles C Jiang
*Assistant Examiner* — Ryan Kavleski
(74) *Attorney, Agent, or Firm* — Birch, Stewart, Kolasch & Birch, LLP

(57) ABSTRACT

According to one embodiment of the present invention, provided is a method in which a terminal performs cell measurements. The method may include the steps of: receiving information on a resource restriction pattern indicating a subframe to which a restriction is applied for performing measurement on one or more neighboring cells; determining that a subframe indicated by second information is not configured as a Multimedia Broadcast over Single Frequency Network (MBSFN) subframe for the neighboring cells if an MBSFN configuration of each of the neighboring cells is not known or not clearly indicated; and performing measurements using a plurality of cell-specific reference signals (CRSs) received from the neighboring cells on the subframe which is not configured as the MBSFN subframe.

4 Claims, 27 Drawing Sheets

FIG. 6
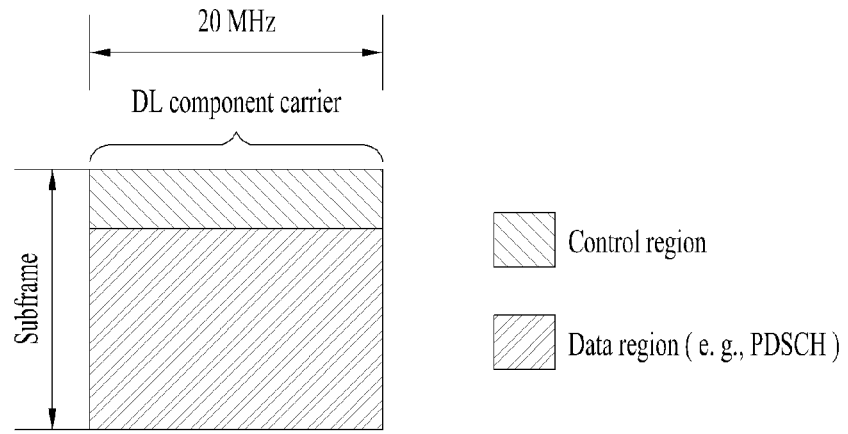
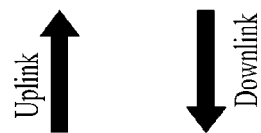
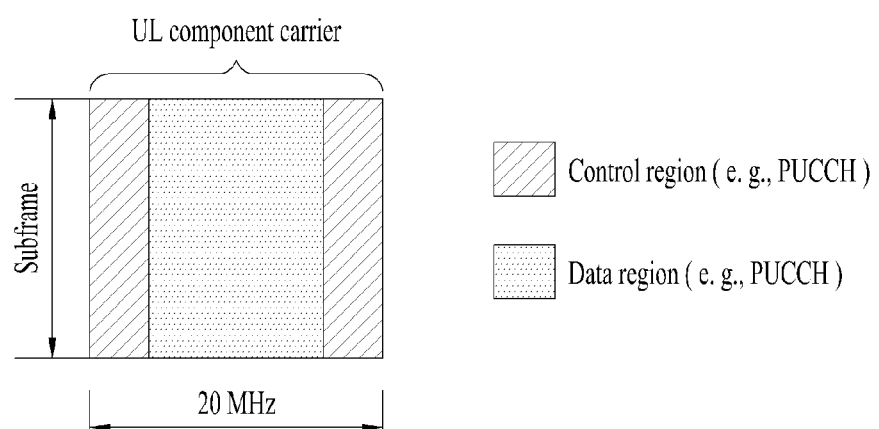
Single component carrier ( e. g. LTE system )

FIG. 12
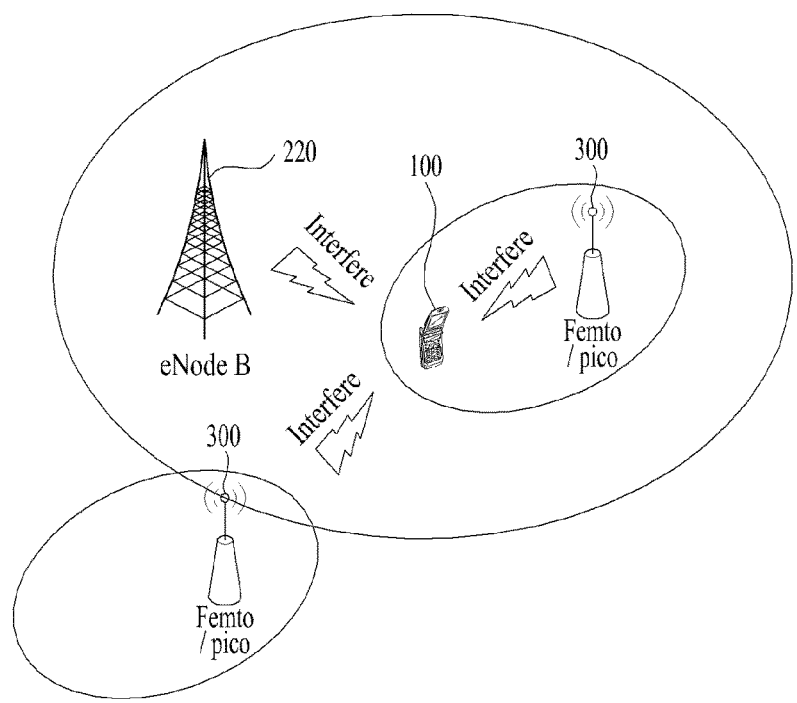
(a)
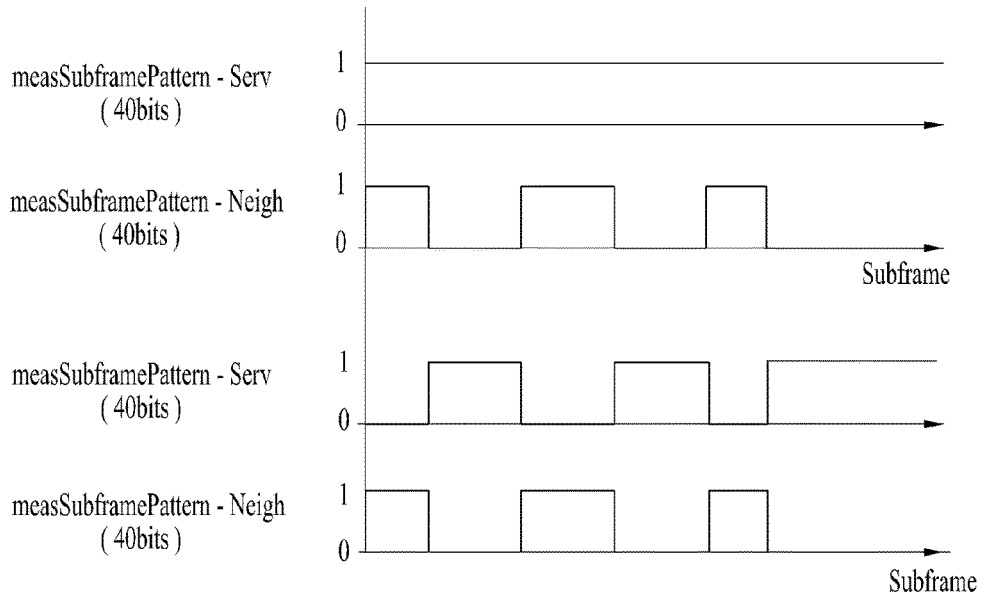
(b)

FIG. 16
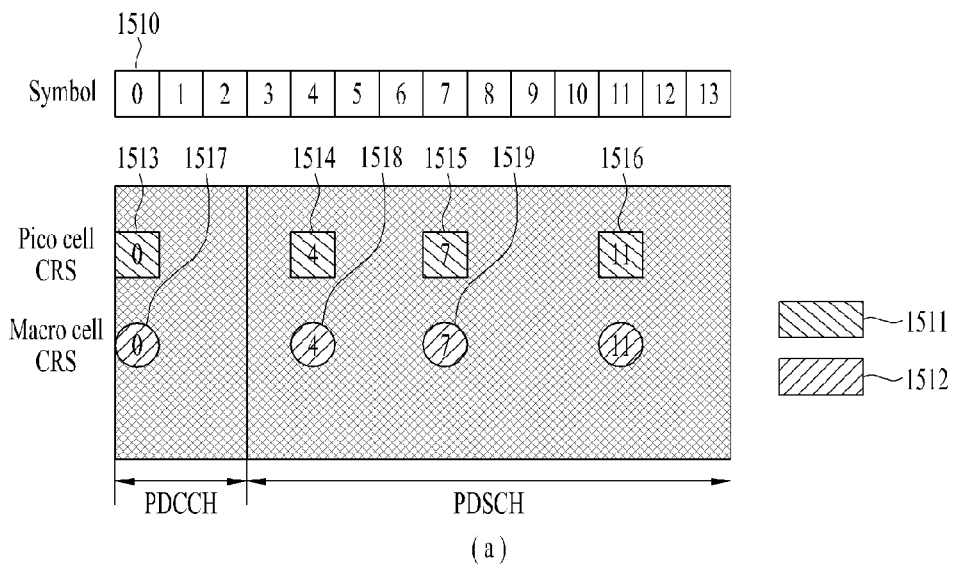
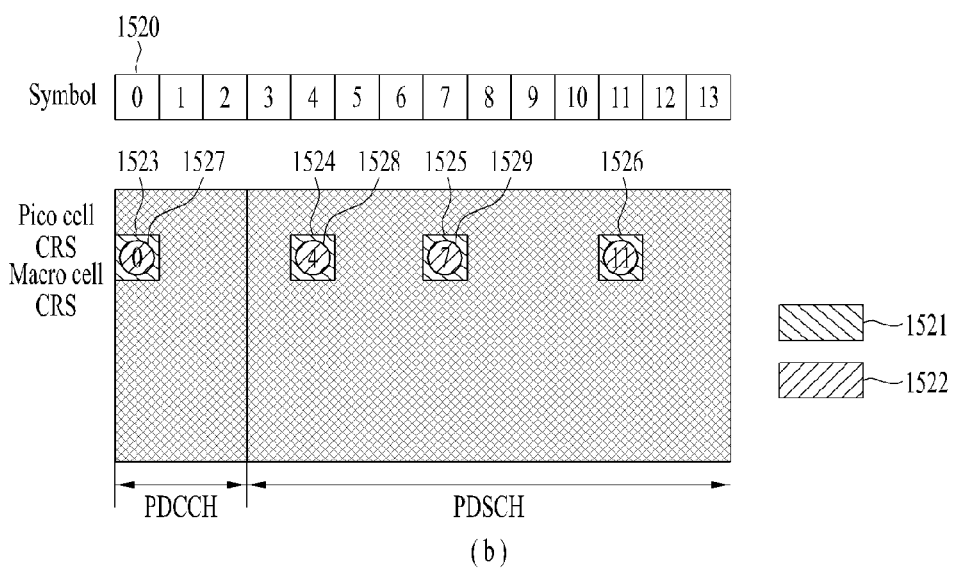

FIG. 18
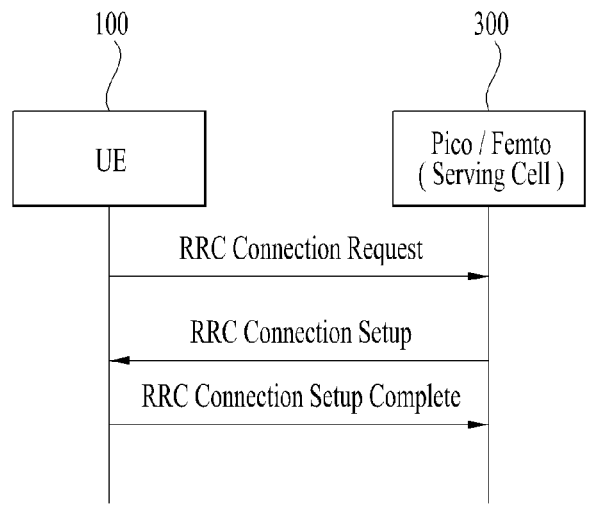
(a)
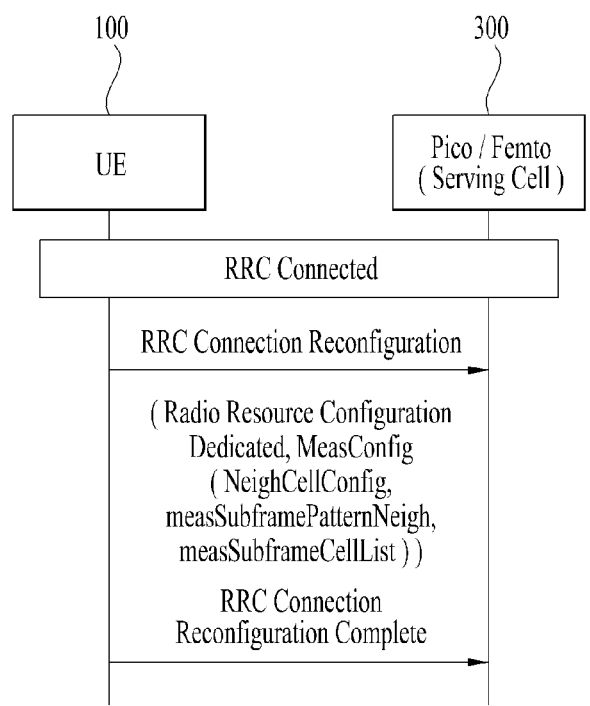
(b)

FIG. 22
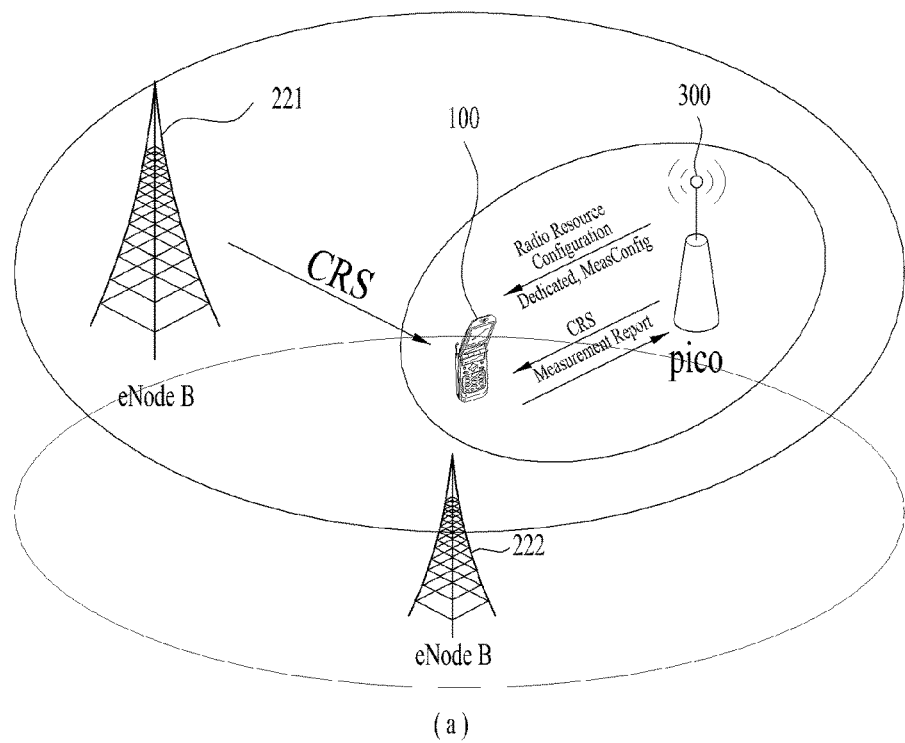
(a)
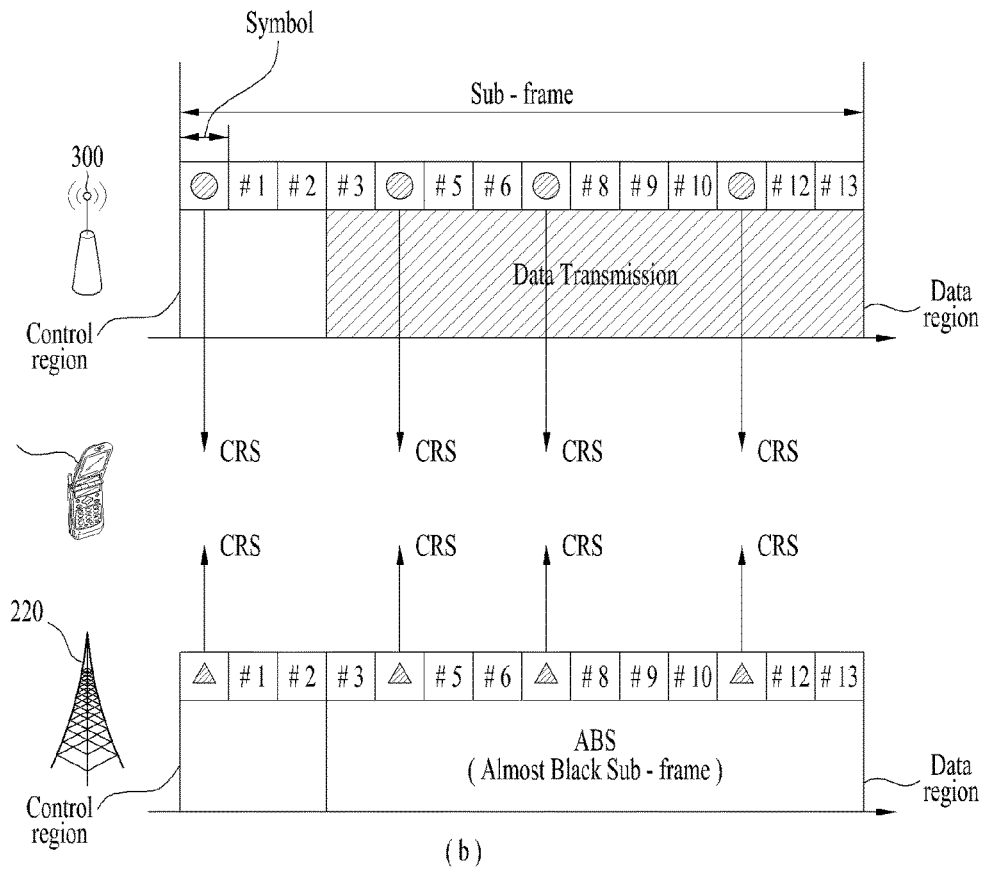
(b)

FIG. 23
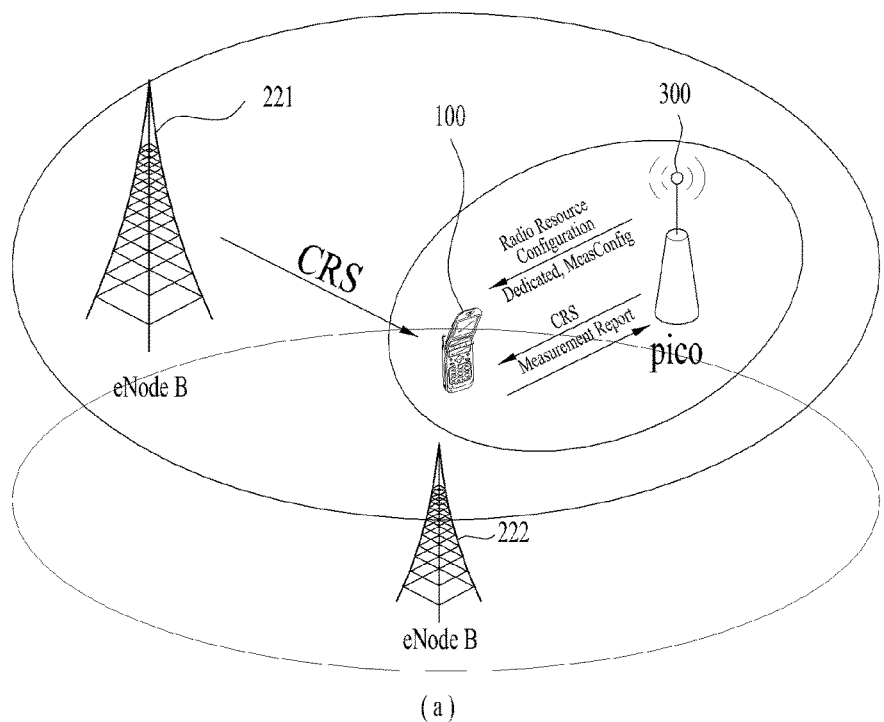
(a)
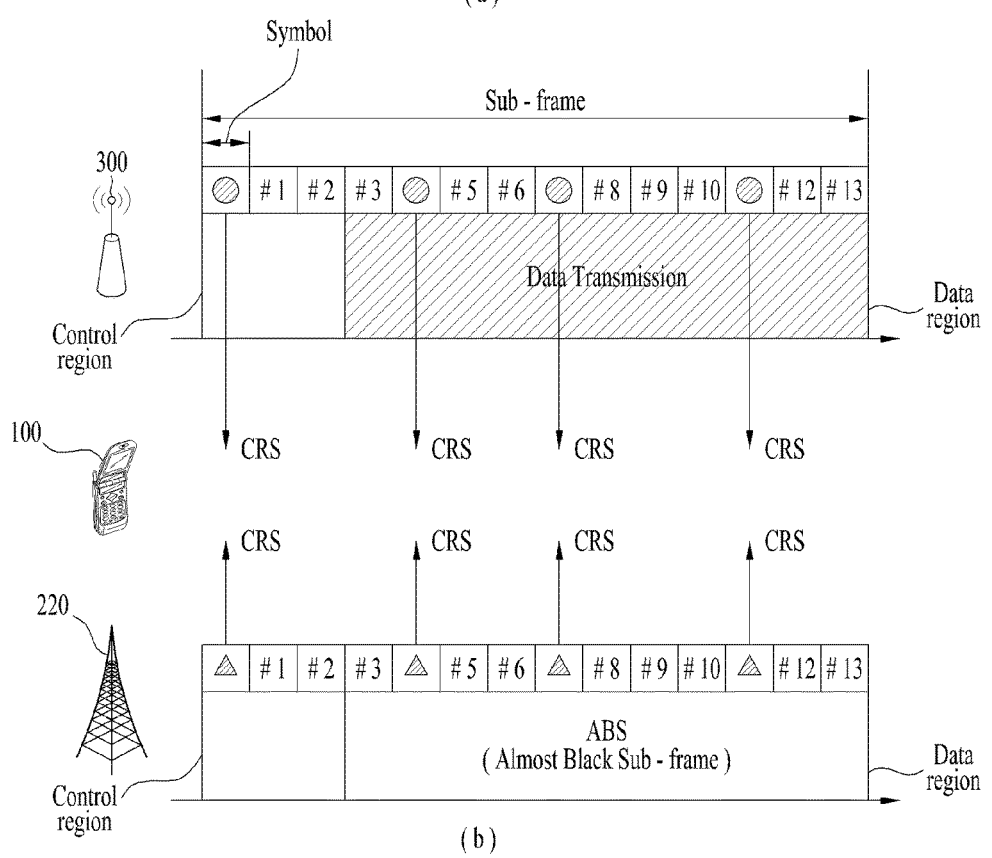
(b)

FIG. 24
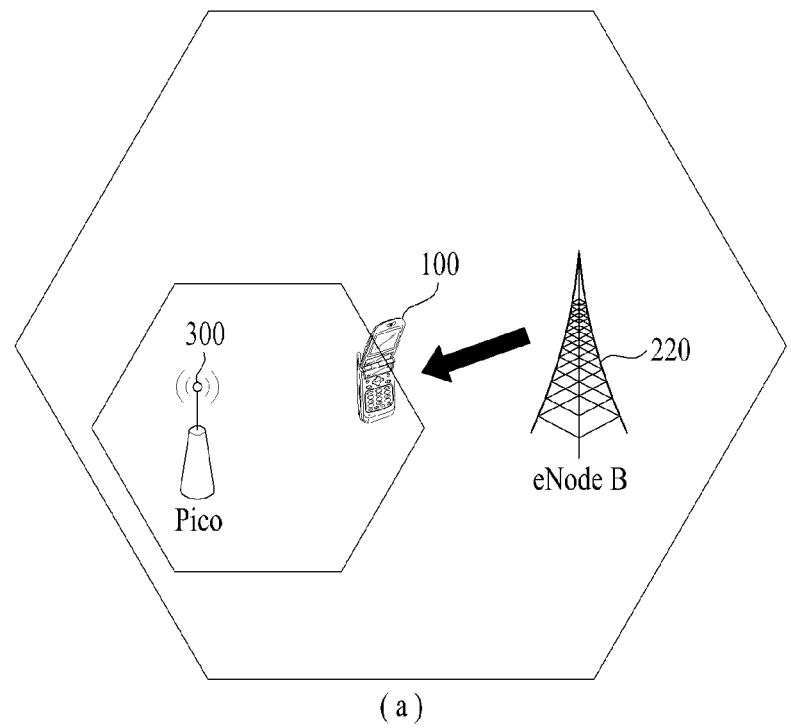
(a)
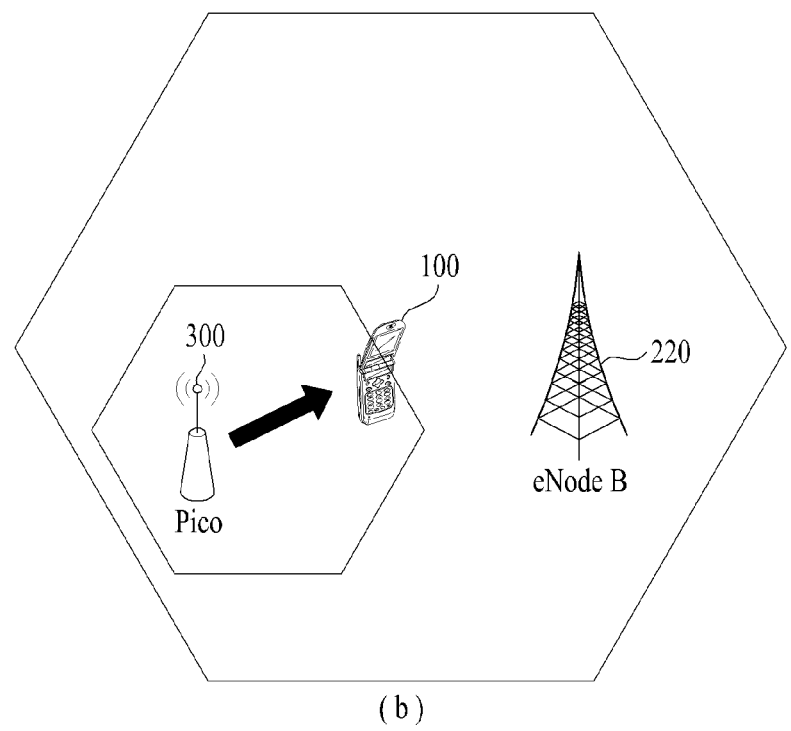
(b)

FIG. 26
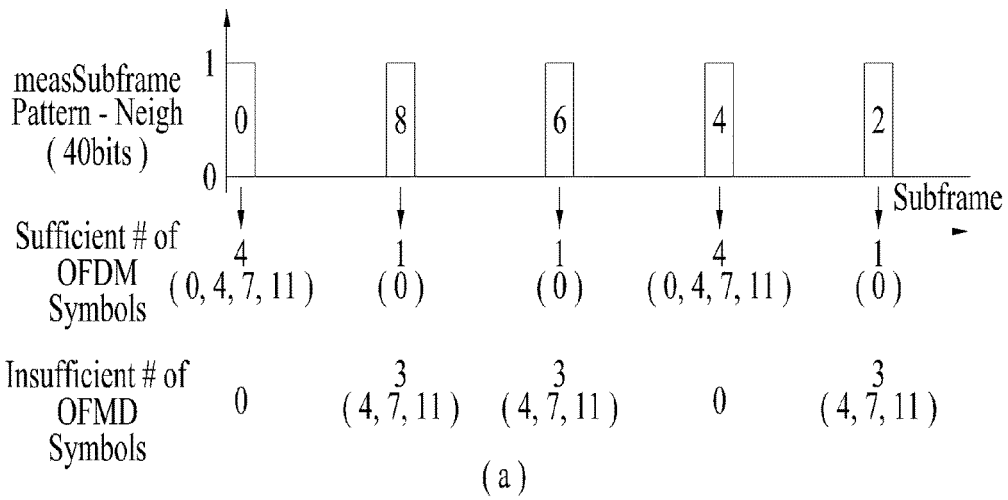
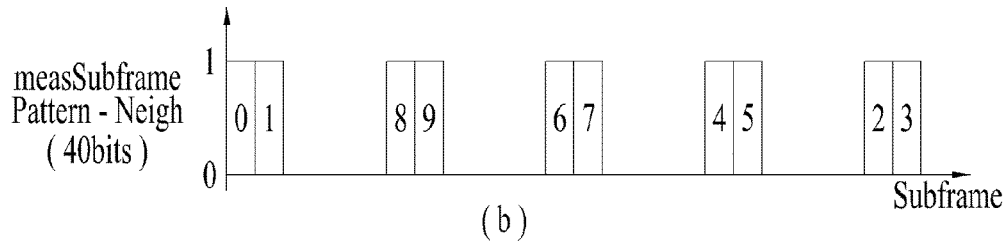
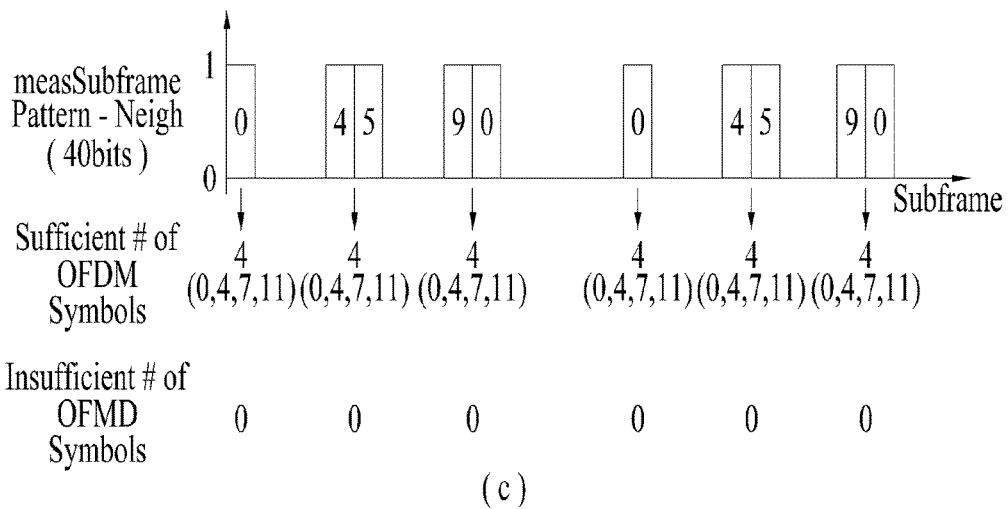

FIG. 28
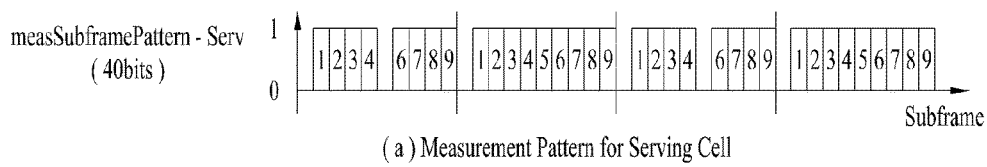
(a) Measurement Pattern for Serving Cell
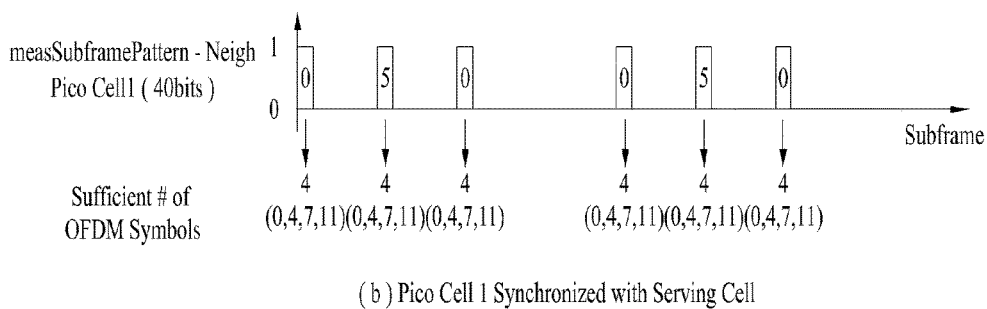
(b) Pico Cell 1 Synchronized with Serving Cell
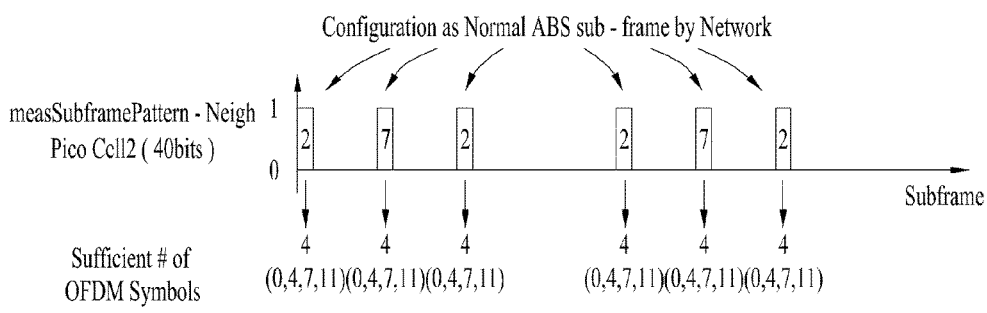
(c) Pico Cell 2 Asynchronized with Serving Cell

CELL MEASURING METHOD AND INFORMATION TRANSMITTING METHOD THEREFOR

This application is the National Phase of PCT/KR2012/004654 filed on Jun. 13, 2012, which claims priority under 35 U.S.C. 119(e) to U.S. Provisional Application Nos. 61/512,921 filed on Jul. 29, 2011 and 61/532,574 filed on Sep. 9, 2011, all of which are hereby expressly incorporated by reference into the present application.

TECHNICAL FIELD

The present invention relates to a cell measuring method and an information transmitting method therefor.

BACKGROUND ART

Recently, research has been ongoing into next-generation multimedia wireless communication systems. As such a system, there is demand for a system that processes and transmits various information such as an image, wireless data, etc. beyond initial voice centered services. One aim of a wireless communication system is to facilitate reliable communication of a plurality of users irrespective of location and mobility. However, a wireless channel undergoes various problems such as path loss, shadowing, fading, noise, limited bandwidth, power limitation of user equipment (UE), and interference between different users. With regard to a design of a wireless communication system, other challenges include resource allocation, mobility issues associated with suddenly changed physical channels, portability, and design for providing security and privacy.

When a transport channel undergoes deep fading, if another version or replica of a transmitted signal is not separately transmitted, a receiver has difficulty in determining the transmitted signal. Resource corresponding to this separate version or replica is called diversity and is one of the most important elements involved in reliable transmission over a radio channel. When the diversity is used, data transmission capacity or data transmission reliability can be maximized. A system for implementing diversity via multiple transmit (Tx) antennas and multiple receive (Rx) antennas is called a multiple input multiple output (MIMO) system.

A scheme for diversity in a MIMO system includes, for example, a space frequency block code (SFBC), a space time block code (STBC), cyclic delay diversity (CDD), frequency switched transmit diversity (FSTD), time switched transmit diversity (TSTD), precoding vector switching (PVS), spatial multiplexing (SM), etc.

One system under consideration in the post third generation system is an orthogonal frequency division multiplexing (OFDM) system that can mitigate an inter-symbol interference (ISI) effect with low complexity. The OFDM system is adapted to transform serial input data symbols into N parallel data symbols and transmit the data symbols with N subcarriers. The subcarriers maintain orthogonality in the frequency domain. Orthogonal frequency division multiple access (OFDMA) refers to multiple access by independently providing each user with some of available subcarriers in a system using the OFDM modulation scheme.

FIG. 1 illustrates a wireless communication system.

Referring to FIG. 1, the wireless communication system includes at least one base station (BS) 20. Each BS 20 provides a communication service to specific geographical areas 20a, 20b, and 20c (each of which generally referred to as a cell). The cell may be re-divided into plural regions (each referred to as a sector). A user equipment (UE) 10 may be fixed or have mobility and may also be referred to as other terms such as a mobile station (MS), a user terminal (UT), a subscriber station (SS), a wireless device, a personal digital assistant (PDA), a wireless modem, a handheld device, etc. In general, the BS 20 refers to a fixed station that communicates with the UE 10 and may also be called an evolved-NodeB (eNB), a base transceiver system (BTS), an access point, etc.

Hereinafter, downlink (DL) refers to communication from a BS to a UE and uplink (UL) refers to communication from a UE to a BS. For DL, a transmitter may be included in a BS and a receiver may be included in a UE. For UL, a transmitter may be included in a UE and a receiver may be included in a BS.

The wireless communication system may be any one of a multiple input multiple output (MIMO) system, a multiple input single output (MISO) system, a single input single output (SISO) system, and a single input multiple output (SIMO) system. The MIMO system uses a plurality of Tx antennas and a plurality of Rx antennas. The MISO system uses a plurality of Tx antennas and one Rx antenna. The SISO system uses one Tx antenna and one Rx antenna. The SIMO system uses one Tx antenna and a plurality of Rx antennas.

Hereinafter, a Tx antenna refers to a physical or logical antenna used to transmit one signal or stream and an Rx antenna refers to a physical or logical antenna used to receive one signal or stream.

A 3rd generation partnership project (3GPP) long term evolution (LTE) system adopts such MIMO. Hereinafter, the LTE system will be described in greater detail.

FIG. 2 illustrates a structure of a radio frame in 3GPP LTE.

Referring to FIG. 2, the radio frame includes 10 subframes each of which includes two slots. Slots in the radio frame are denoted by slot numbers 0 to 19. Time taken to transmit one subframe is referred to as a transmission time interval (TTI). The TTI may be a scheduling unit for data transmission. For example, one radio frame is 10 ms long, one subframe is 1 ms long, and one slot is 0.5 ms long.

The structure of the radio frame is purely exemplary and the number or subframes included in the radio frame or the number of slots included in the subframe may be changed in various ways.

FIG. 3 is a diagram illustrating a resource grid of one UL slot in 3GPP LTE.

Referring to FIG. 3, a UL slot includes a plurality of orthogonal frequency division multiplexing (OFDM) symbols in the time domain and $N^{UL}$ resource blocks (RBs) in the frequency domain. An OFDM symbol is used to represent one symbol period and may be referred to as an SC-FDMA symbol, an OFDMA symbol, or a symbol period according to a system. An RB is a resource allocation unit and includes a plurality of subcarriers in the frequency domain. $N^{UL}$, the number of RBs included in the UL slot depends upon a UL transmission bandwidth configured in a cell. Each element on the resource grid is referred to as a resource element.

FIG. 3 illustrates an example in which one RB includes 7 OFDM symbols in the time domain and 7×12 resource elements including 12 subcarriers in the frequency domain. However, the number of subcarriers in the RB and the number of OFDM symbols are not limited thereto. The number of subcarriers or the number of OFDM symbols included in the RB may be changed in various ways. The number of OFDM symbols may vary according to a length of cyclic prefix (CP). For example, in the case of a normal CP, the number of OFDM symbols is 7, and in the case of an extended CP, the number of OFDM symbols is 6.

The resource grid of one UL slot in the 3GPP LTE of FIG. 3 can also be applied to a resource grid of a DL slot.

FIG. 4 illustrates a structure of a DL subframe.

The DL subframe includes two slots in the time domain. Each slot includes 7 OFDM symbols in the case of a normal CP. Up to three OFDM symbols (up to four OFDM symbols for a bandwidth of 1.4 MHz) at the start of the first slot in a downlink subframe are used for a control region to which control channels are allocated and the other OFDM symbols of the downlink subframe are used for a data region to which a physical downlink shared channel (PDSCH) is allocated. The PDSCH refers to a channel for transmitting data to a UE from a BS.

A physical downlink control channel (PDCCH) may deliver information about resource allocation (referred to as DL grant) and a transport format for a downlink shared channel (DL-SCH), resource allocation information (referred to as UL grant) about an uplink shared channel (UL-SCH), paging information of a paging channel (PCH), system information on the DL-SCH, information about resource allocation for a higher-layer control message such as a random access response transmitted on the PDSCH, a set of transmission power control (TPC) commands for individual UEs of a random UE group, transmission power control information, voice over Internet protocol (VoIP) activation information, etc. Control information transmitted the aforementioned PDCCH is referred to as DL control information (DCI).

Hereinafter, a DL reference signal (RS) will be described in greater detail.

In a 3GPP LTE system, two types of DL RSs for a unicast service are defined as a common RS, that is, a cell-specific RS (CRS) and a dedicated RS, that is, a UE-specific RS (DRS).

The CRS is an RS shared among all UEs of a cell and is used to acquire information about a channel state and in measuring handover. The DRS is an RS for a specific UE and is used to demodulate data. The CRS may be a cell-specific RS and the DRS may be a UE-specific RS.

A UE measures the CRS and informs a BS of feedback information such as channel quality information (CQI), precoding matrix indicator (PMI), and rank indicator (RI). The BS performs DL frequency domain scheduling using the feedback information received from the UE.

The BS allocates resources in consideration of an amount of radio resources to be allocated to an RS, exclusive locations of the CRS and the DRS, locations of synchronization channel (SCH) and broadcast channel (BCH), density of the DRS, etc. in order to transmit the RS to the UE.

In this case, when a relatively large amount of resources are allocated to the RS, although high channel estimation performance can be achieved, a data transfer rate is relatively reduced. When a relatively small amount of resources are allocated to the RS, although a high data transfer rate can be obtained, density of the RS is reduced, resulting in degraded channel estimation performance. Thus, effective resource allocation to the RS in consideration of channel estimation, data transfer rate, etc. is an important factor in determining system performance.

In a 3GPP LTE system, the DRS is used for data demodulation only and the CRS is used for both channel information acquisition and data demodulation. In particular, the CRS is transmitted every subframe in a wide band and transmitted per antenna port of the BS. For example, when the number of Rx antennas of the BS is two, CRSs are transmitted to antenna ports #0 and #1. When the number of Rx antennas of the BS is four, CRSs are transmitted to antenna ports #0 to #3.

FIG. 5 illustrates an example of a structure of a UL subframe in 3GPP LTE.

Referring to FIG. 5, the UL subframe may be divided into a control region and a data region. A physical uplink control channel (PUCCH) for delivering UL control information is allocated to the control region. A physical uplink shared channel (PUSCH) for delivering UL data is allocated to the data region. To maintain single carrier properties, RBs allocated to one UE are contiguous. One UE cannot simultaneously transmit the PUCCH and the PUSCH.

The PUCCH for one UE is allocated to an RB pair in a subframe. RBs of the RB pair occupy different subcarriers in a first slot and a second slot. A frequency occupied by the RBs of the RB pair allocated to the PUCCH is changed at a slot boundary. As the UE transmits UL control information over time through different subcarriers, frequency diversity gain can be obtained.

The UL control information transmitted on the PUCCH may include hybrid automatic repeat request (HARQ) acknowledgement/negative acknowledgement (ACK/NACK), channel quality indicator (CQI) indicating a DL channel state, scheduling request (SR) as a UL radio resource allocation request, etc.

The PUSCH is mapped to an uplink shared channel (UL-SCH) that is a transport channel. UL data transmitted on the PUSCH may be a transport block that is a data block for UL-SCH transmitted during the TTI. The transport block may be user information. Alternatively, the UL data may be multiplexed data. The multiplexed data may be obtained by multiplexing the control information and transfer block for the UL-SCH. For example, the control information multiplexed to data may include a CQI, a precoding matrix indicator (PMI), HARQ ACK/NACK, a rank indicator (RI), or the like. Alternatively, the UL data may include control information alone.

A high data transfer rate is required. A most basic and stable solution is to increase bandwidth.

However, frequency resources are currently saturated and various technologies have been partially used in wide frequency bands. Thus, as a method for ensuring a wide bandwidths in order to satisfy requirements for higher data transfer rate, scattered bands are designed to satisfy basic requirements for operations of independent systems, and carrier aggregation (CA) that refers to binding a plurality of bands to one system has been introduced. In this case, a band for independent management is defined as a component carrier (CC).

CA technology is adapted in an LTE-Advanced (LTE-A) system as well as by an LTE system.

Carriers Aggregation

A CA system refers to a system that collects one or more carriers having a smaller band than a target wide band to configure a wide band when a wireless communication system supports the wide band. The CA system may be referred to as other terms such as a multiple carrier system, bandwidth aggregation system, etc. The CA system may be categorized into a contiguous CA system with contiguous carriers and a non-contiguous CA system with noncontiguous carriers. Hereinafter, the multiple carrier system or the CA system needs to be understood as both cases in which component carriers are contiguous and noncontiguous.

In the contiguous CA system, a guard band may be present between carriers. When one or more carriers are collected, a target carrier may use a bandwidth used in a conventional system without change for backward compatibility with the conventional system. For example, the 3GPP LTE system supports bandwidths of 1.4 MHz, 3 MHz, 5 MHz, 10 MHz, 15 MHz, and 20 MHz. Alternatively, the 3GPP LTE system may define new bandwidths to configure a wide band instead of the bandwidths of the conventional system.

In a CA system, a UE can simultaneously transmit or receive one or plural carriers according to capacity thereof.

FIG. 6 illustrates an example of communication in a single component carrier situation. The example illustrated in FIG. 6 may correspond to communication in an LTE system.

Referring to FIG. 6, a general wireless communication system using a general frequency division duplex (FDD) scheme transmits and receives data in one DL band and one UL band corresponding thereto. A BS and a UE transmit and receive data and/or control information scheduled in units of subframes. The data is transmitted and received through a data region configured in an UL/DL subframe and the control information is transmitted and received through a control region configured in the UL/DL subframe. To this end, the UL/DL subframe delivers a signal through various physical channels. FIG. 7 is based on the FDD scheme for convenience of description. However, the above description can be applied to a time division duplexing (TDD) scheme by dividing a radio frame into UL and DL in the time domain.

FIG. 7 illustrates an example of communication in a multiple component carrier situation.

The example of FIG. 7 may correspond to communication in an LTE-A system.

The LTE-A system uses carrier aggregation, bandwidth aggregation, or spectrum aggregation technologies to collect a plurality of UL/DL frequency blocks to use wider UL/DL bandwidths in order to use wider frequency bands. Each frequency block is transmitted using a component carrier (CC). Throughout this specification, the CC may refer to a frequency block for CA and a center carrier of the frequency block according to context, which are interchangeably used.

On the other hand, although the 3GPP LTE system supports a case in which DL and UL bandwidths are configured in different ways, one component carrier (CC) is assumed. The 3GPP LTE system may support a maximum of 20 MHz and have different UL and DL bandwidths, but support only one CC in UL and DL.

However, spectrum aggregation (which is also referred to as bandwidth aggregation or carrier aggregation) supports a plurality of CCs. For example, when five CCs are allocated as granularity of a carrier unit having a bandwidth of 20 MHz, a maximum bandwidth of 100 MHz can be supported.

One DL CC or a pair of UL CC and DL CC may correspond to one cell. One cell basically includes one DL CC and optional UL CC. Thus, it is deemed that a UE that communicates with a BS through a plurality of DL CCs receives services from a plurality of serving cells. In this case, DL includes a plurality of DL CCs but UL may use only one CC. Thus, it is deemed that the UE receives services from a plurality of serving cells in DL and receives a service from only one serving cell in UL.

From this point, the serving cell may be categorized into a primary cell and a secondary cell. The primary cell operates at a primary frequency and is a cell configured as a primary cell while a UE perform an initial connection establishment procedure, initiates a connection reestablishment procedure, or performs a handover procedure. The primary cell may also be referred to as a reference cell. The secondary cell may operate at a secondary frequency, may be configured after RRC connection establishment, and may be used to provide additional radio resources. At least one primary cell may always be configured as the primary cell and the secondary cell may be added/modified/released via higher layer signaling (e.g., an RRC message).

Referring to FIG. 7, five CCs of 20 MHz may be collected in each of UL and DU to support a bandwidth of 100 MHz. CCs may be contiguous or noncontiguous in the frequency domain. For convenience of description, FIG. 9 illustrates a case in which a bandwidth of UL CC and a bandwidth of DL CC are the same and symmetrical with each other. However, bandwidths of CCs may be independently determined. For example, the UL CC bandwidth may be configured as 5 MHz (UL CC0)+20 MHz (UL CC1)+20 MHz (UL CC2)+20 MHz (UL CC3)+5 MHz (UL CC4). In addition, asymmetrical CA may be possible such that the number of UL CCs and the number of DL CCs differ. The asymmetrical CA may be generated due to limitation of an available frequency band or intentionally configured via network configuration. For example, even if a total band of a system includes N CCs, a frequency band for reception of a specific UE may be limited to M (<N) CCs. Various parameters for CA may be configured cell-specifically, UE group-specifically, or UE-specifically.

FIG. 7 illustrates an example in which a UL signal and a DL signal are transmitted through CCs that are mapped in one-to-one correspondence. However, a CC for actually transmitting a signal may vary according to network configuration or signal type.

For example, when a scheduling command is transmitted through DL CC1 in DL, data based on the scheduling command may be executed through a different DL CC or UL CC. In addition, control information associated with a DL CC may be transmitted through a specific UL CC in UL irrespective of mapping. Similarly, DL control information may also be transmitted through a specific DL CC.

FIG. 8 is a block diagram for explanation of a single carrier (SC)-TDMA transmission scheme that is a UL access scheme adopted in 3GPP LTE.

SC-FDMA is adapted for UL of LTE. SC-FDMA is similar to orthogonal frequency division multiplexing (OFDM) but reduces a peak to average power ratio (PAPR) to reduce power consumption of a portable terminal and costs of a power amplifier.

SC-FDMA is very similar to OFDM in that signals are also separately transmitted through subcarriers using fast Fourier transform (FFT) and inverse-FFT (IFFT). In addition, SC-FDMA is also the same as conventional OFDM technology in that a simple equalizer in the frequency domain can also be used with respect to inter-symbol interference (ISI) caused by multipath fading by using a guard interval (cyclic prefix). However, SC-FDMA is an additional unique technology in that a PAPR at a receiver is reduced by about 2 to 3 dB to improve power efficiency of a transmitter.

That is, problems arise with regard to a conventional OFDM transmitter in that signals carried in each subcarrier on the frequency axis are converted into signals of the time axis via IFFT. That is, the IFFT is performed by performing the same calculation in parallel, thereby increasing PAPR.

Referring to FIG. 8, as one solution to this problem, SC-FDMA performs discrete Fourier transform (DFT) 102 on information prior to mapping a signal to a subcarrier. The signal spread (or precoded, having the same meaning) via the DFT is mapped 13 to the subcarrier, and then IFFT 14 is performed on the signal to form a signal of the time axis.

In this case, according to a relationship of the DFT 12, the subcarrier mapping 13, and the IFFT 14, SC-FDMA is advantageous in terms of transmit power efficiency in that a PAPR of a signal of the time axis is not dramatically increased after the IFFT 14 unlike OFDM.

That is, a transmission scheme in which IFFT is performed after DFT spreading is referred to as SC-FDMA.

Due to the advantages of SC-FDMA, robustness of a multipath channel can be achieved and simultaneously the disadvantages of the conventional OFDM of increasing PAPR can be basically overcome via IFFT calculation by adopting a similar structure to OFDM, and thus, an effective power amplifier can be used. SC-FDMA may also be called DFT spread OFDM (DFT-s-OFDM) having the same meaning as SC-FDMA.

That is, in SC-FDMA, peak-to-average power ratio (PAPR) or cubic metric (CM) may be reduced. When the SC-FDMA transmission scheme is used, a non-linear distortion period of a power amplifier can be avoided, and thus, transmission power efficiency of a UE with limited power consumption can be increased. Thus, user throughput can be increased.

3GPP has actively conducted into the LTA-A standard as improved LTE. During standardization of LTE-A, SC-FDMA based technologies and OFDM technologies were also competitively discussed as in standardization of LTE, but a clustered-DFT-s-OFDM scheme for allowing non-contiguous resource allocation was adopted.

An LTE-A system will be described in greater detail.

FIG. 9 is a block diagram for explanation of the clustered DFT-s-OFDM transmission scheme adopted as a UL access scheme in the LTE-A standard.

As an important feature of the clustered DFT-s-OFDM scheme, frequency selective resource allocation may be possible so as to flexibly handle frequency selective fading.

In this case, in clustered DFT-s-OFDM adapted as a UL access scheme of LTE-A, non-contiguous resource allocation is allowed unlike SC-FIRMA as a conventional UL access scheme of LTE and thus, transmitted UL data can be divided in various cluster units.

That is, the LTE system maintains single carrier property for UL. On the other hand, the LTE-A system allows a case in which DFT precoded data is noncontiguously allocated on the time axis or a PUSCH and a PUCCH are simultaneously transmitted.

DISCLOSURE

Technical Problem

An object of the present invention devised to solve the problem lies in a method for effectively measuring reference signal received power (RSRP) and reference signal received quality (RSRQ) by a user equipment.

Technical Solution

The object of the present invention can be achieved by providing a cell measuring method of a user equipment (UE). The method includes receiving information about a resource restriction pattern indicating a subframe to which restriction is applied for performing measurement on one or more neighbor cells, determining that a subframe indicated by second information is not configured as a multimedia broadcast over single frequency network (MBSFN) subframe for the neighbor cells when MBSFN configuration of each of the neighbor cells is not known or not clearly indicated, and performing measurement using a plurality of cell-specific reference signals (CRSs) received from the neighboring cells on the subframe which is not configured as the MBSFN subframe.

The method may further include receiving radio resource configuration dedicated information element (IE) including first information about measurement resource restriction pattern for a primary cell.

Information of the resource restriction pattern may be included in a measurement object and received.

The method may further include receiving a neighbor cell configuration information element indicating MBSFN of one or more neighbor cells.

In another aspect of the present invention, provided herein is a method for transmitting information for cell measurement. The method may include configuring a subframe for performing measurement by a serving cell, wherein the subframe configured by the serving cell is different from a subframe for performing measurement on a first neighbor cell, and transmitting first pattern information about the subframe configured by the serving cell and second pattern information indicating a subframe for performing measurement on the first neighbor cell, to a UE, wherein the first pattern information or the second pattern information indicates a subframe for measurement in a bit 1, and the first pattern information or the second pattern information indicates at least one subframe for the measurement per frame.

The subframe configured by the serving cell may be different from a subframe for performing measurement on a second neighbor cell.

A subframe for performing measurement on the first neighbor cell may be different from a subframe for performing measurement on a second neighbor cell.

The configuring of the subframe may include configuring the subframe based on a group whether neighbor cells are pico cells or macro cells.

The configuring of the subframe may be performed in consideration of whether the subframe is configured as an MBSFN subframe.

The pattern information may be a time domain measurement resource restriction pattern or measSubframePattern.

The first pattern information may be measSubframePattern-Serv or the second pattern information is measSubframePattern-Neigh.

The second pattern information may be received via X2 interface based signaling.

In another aspect of the present invention, provided herein is a user equipment (UE) for performing cell measurement. The UE may include a receiver for receiving information about a resource restriction pattern indicating a subframe to which restriction is applied for performing measurement on one or more neighbor cells, and a controller for determining that a subframe indicated by second information is not configured as a multimedia broadcast over single frequency network (MBSFN) subframe for the neighbor cells when MBSFN configuration of each of the neighbor cells is not known or not clearly indicated, and for performing measurement using a plurality of cell-specific reference signals (CRSs) received from the neighboring cells on the subframe which is not configured as the MBSFN subframe.

In another aspect of the present invention, provided herein is a serving cell base station (BS) for transmitting information for cell measurement. The serving cell BS may include a controller for configuring a subframe for performing measurement, wherein the configured subframe is different from a subframe for performing measurement on a first neighbor cell, and a transmitter for transmitting first pattern information about the subframe configured by the serving cell and second pattern information indicating a subframe for performing measurement on the first neighbor cell, to a UE, according to control of the controller, wherein the first pattern information or the second pattern information indicates a subframe for measurement in a bit 1, and the first pattern information or the second pattern information indicates at least one subframe for the measurement per frame.

Advantageous Effects

According to embodiments of the present invention, measurement accuracy of reference signal received power (RSRP) and reference signal received quality (RSRQ) can be increased and also measurement time thereof can be reduced.

DESCRIPTION OF DRAWINGS

FIG. 6 illustrates an example of communication in a single component carrier situation;

FIG. 12 illustrates an example of an operation of enhanced inter-cell interference coordination (eICIC).

FIG. 16 illustrates an example in which a cell-specific reference signal (CRS) of a macro BS and a CRS of a pico BS overlap.

FIG. 18 illustrates a process for transmitting information for measurement to a user equipment (UE).

FIG. 22 illustrates an example of measurement of reference signal received power (RSRP) and reference signal received quality (RSRQ).

FIG. 23 illustrates a method for more effective measurement.

FIG. 24 illustrates an example of a case in which a UE is located in coverage of a pico cell and coverage of a macro cell eNodeB.

FIG. 26 illustrates an example of the second method for accurately measure measurement quality in an environment in which adjacent cells are MBSFN-configured.

FIG. 28 illustrates further another example of the second method for accurately measure measurement quality in an environment in which adjacent cells are MBSFN-configured.

BEST MODE

Figure 1:
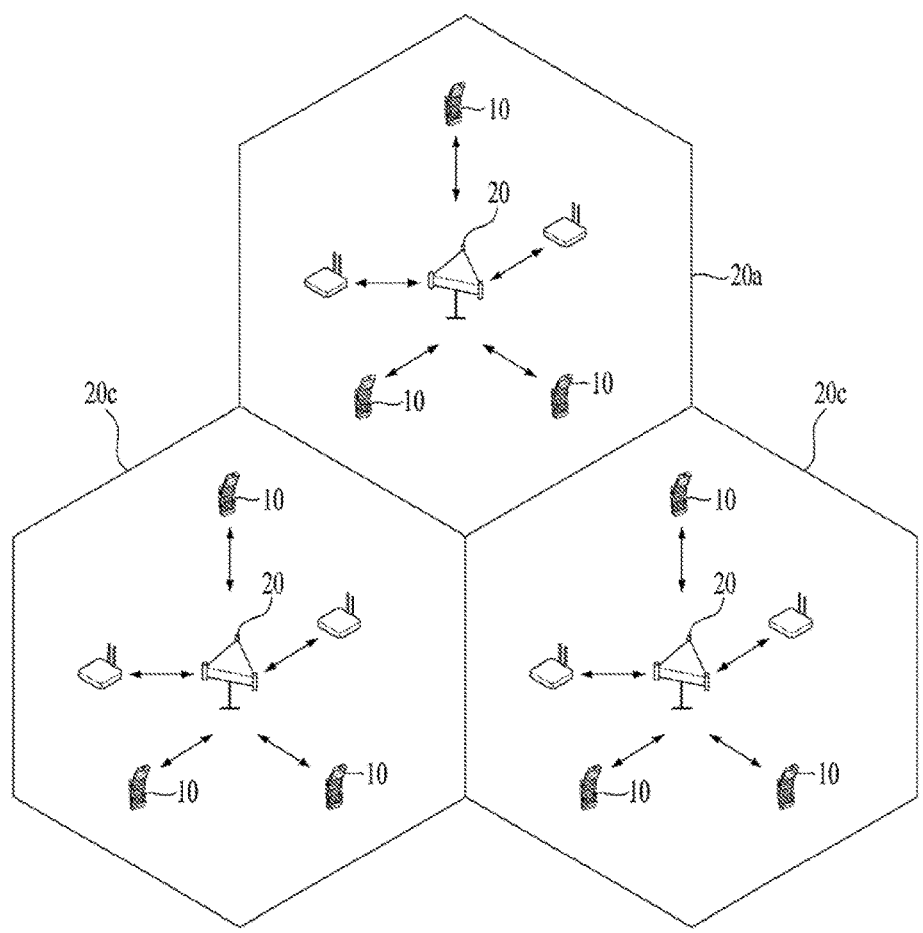
FIG. 1 illustrates a wireless communication system.
Figure 2:
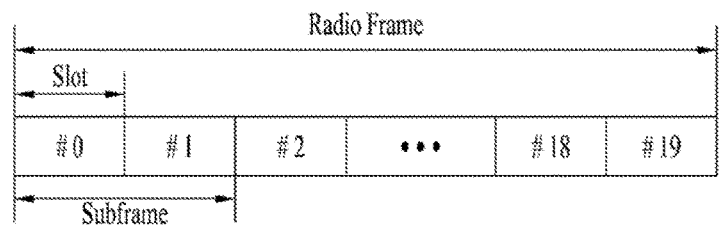
FIG. 2 illustrates a structure of a radio frame in 3rd generation partnership project (3GPP) long term evolution (LTE).
Figure 3:
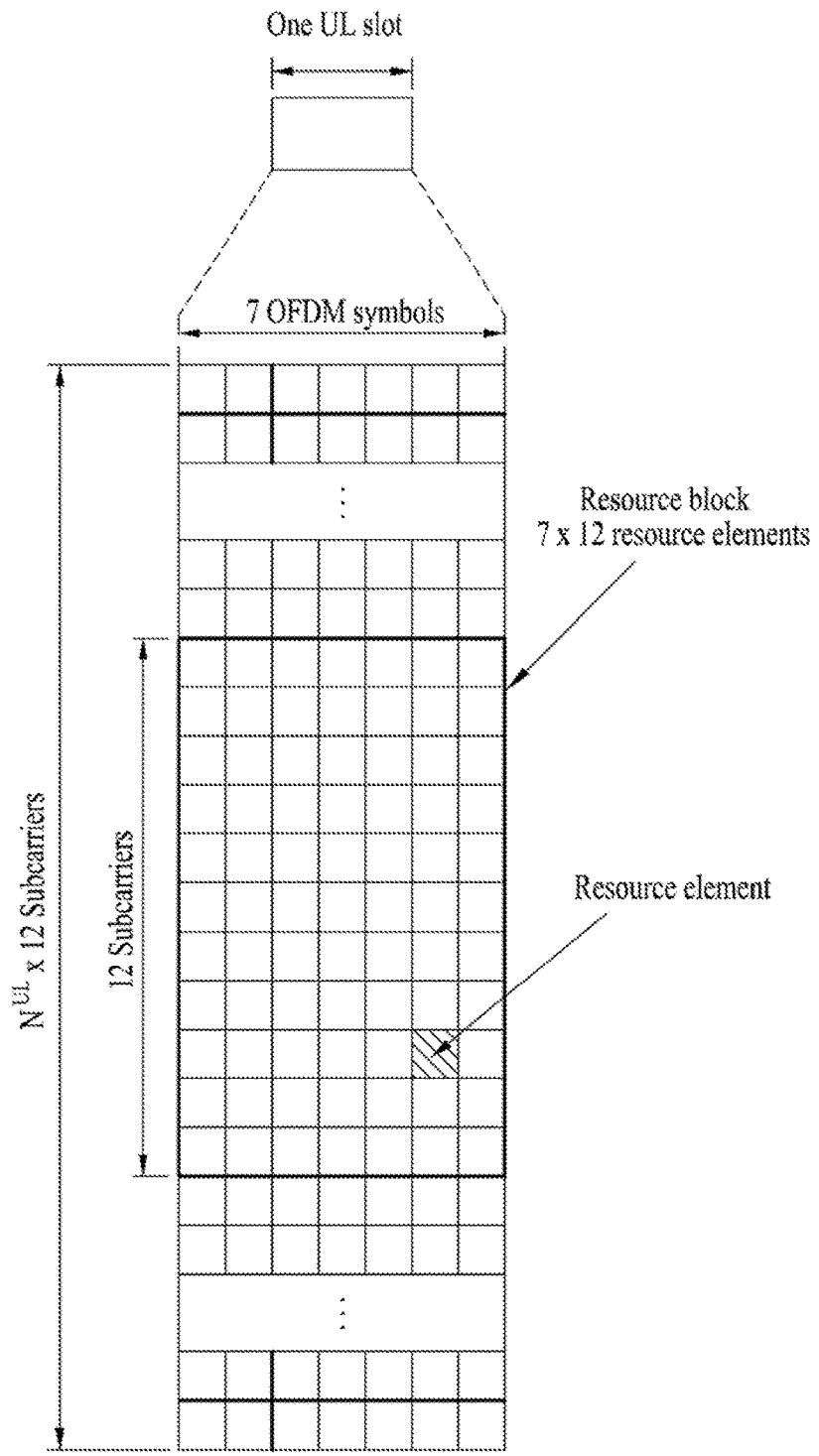
FIG. 3 is a diagram illustrating a resource grid of one UL slot in 3GPP LTE.
Figure 4:
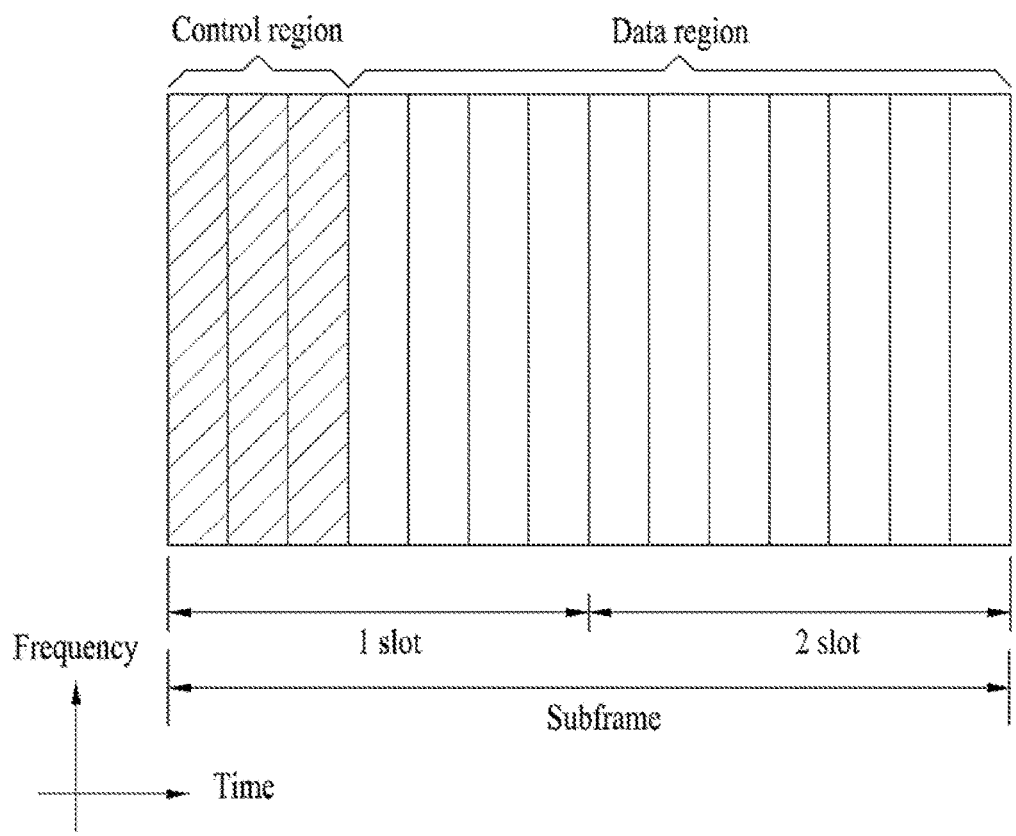
FIG. 4 illustrates a structure of a downlink (DL) subframe.
Figure 5:
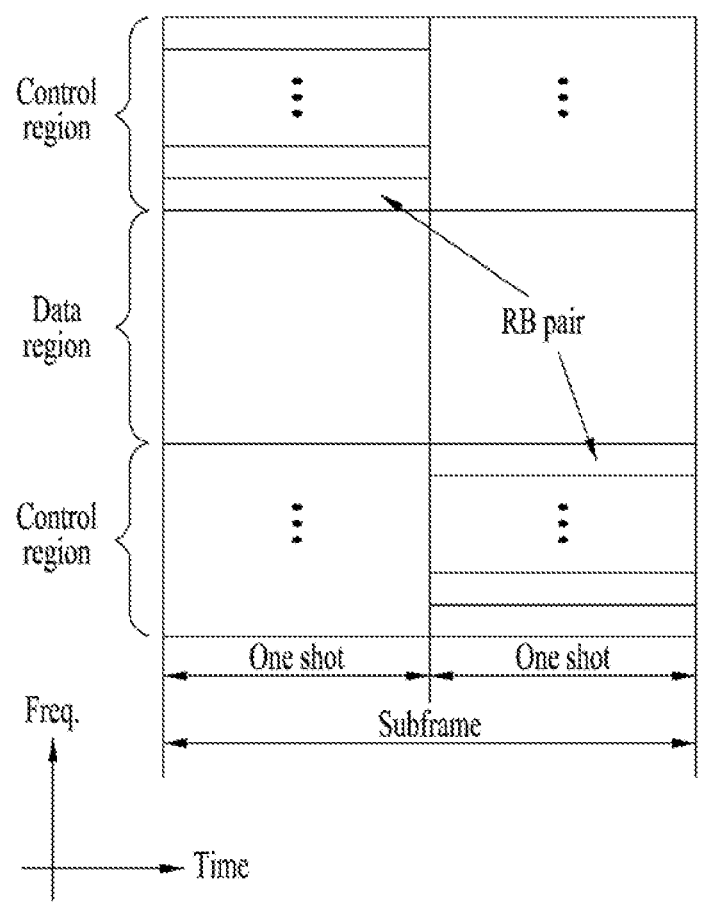
FIG. 5 illustrates an example of a structure of an uplink (UL) subframe in 3GPP LTE.
Figure 7:
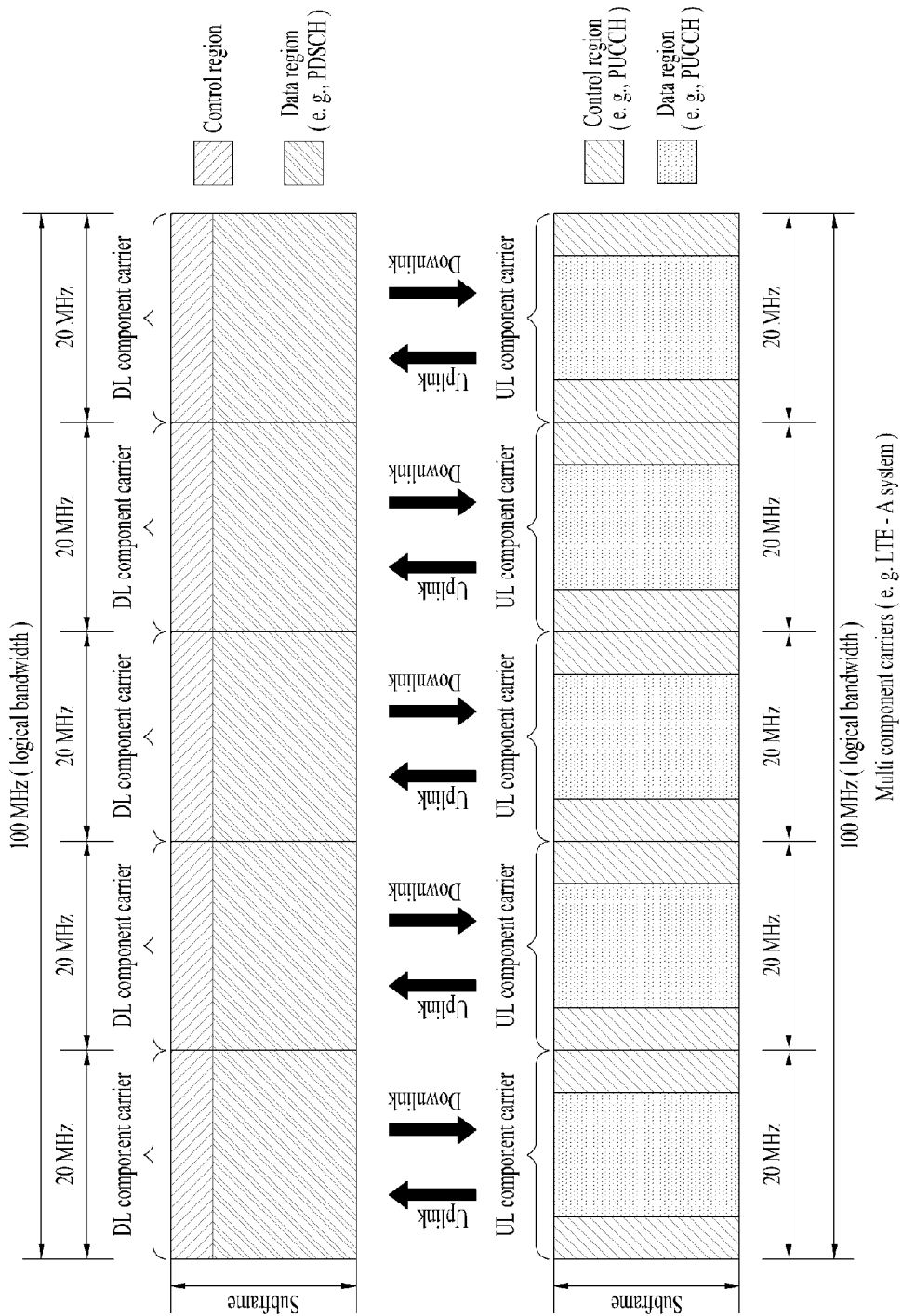
FIG. 7 illustrates an example of communication in a multiple component carrier situation.
Figure 8:
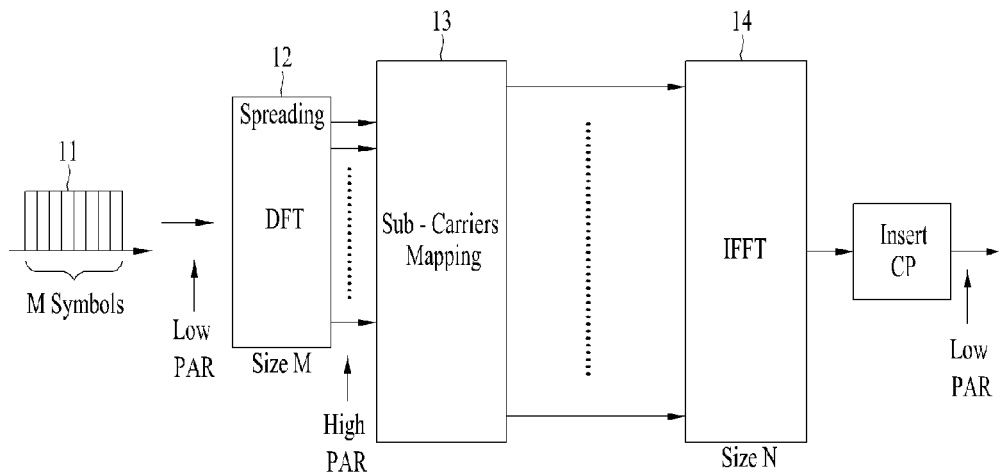
FIG. 8 is a block diagram for explanation of a single carrier (SC)-FDMA transmission scheme that is an UL access scheme adapted in 3GPP LTE.
Figure 9:
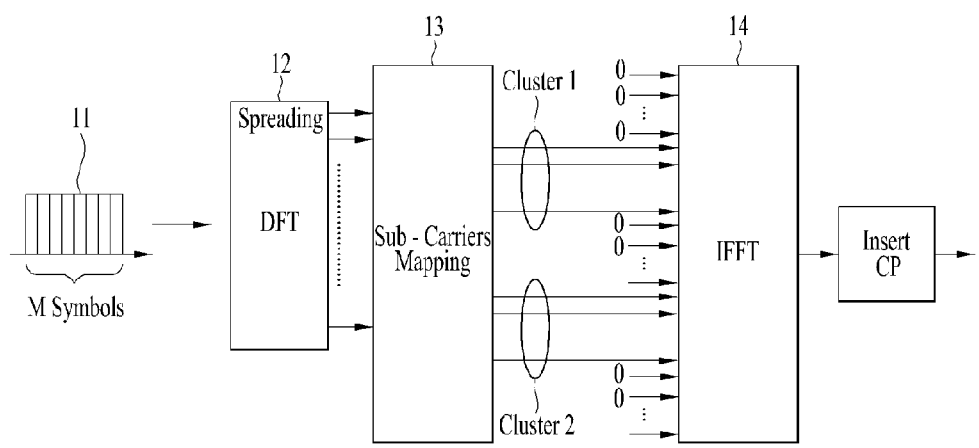
FIG. 9 is a block diagram for explanation of the clustered DFT-s-OFDM transmission scheme adapted as an UL access scheme in the LTE-A standard.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

The terminology used herein is for the purpose of describing particular embodiments only and is not intended to be limiting of the present invention. Unless otherwise defined, all technical terms used herein have the same meaning as commonly understood by one of ordinary skill in the art to which this present invention belongs and will not be interpreted in overly wide or narrow sense unless expressly so defined herein. If a term used herein is a wrong term by which one of ordinary skill in the art cannot correctly understand the present invention, the wrong term should be replaced by a technical term by which one of ordinary skill in the art can correctly understand the present invention. It will be further understood that terms, such as those defined in commonly used dictionaries, should be interpreted as having a meaning that is consistent with their meaning in the context of the relevant art and will not be interpreted in an overly narrow sense.

As used herein, the singular forms "a," "an" and "the" are intended to include the plural forms as well, unless the context clearly indicates otherwise. It will be further understood that the terms "comprises" or "comprising" are not intended to included all elements or all steps described herein, but do not preclude exclusion of some elements or steps described herein or addition of one or more other elements or steps.

It will be understood that, although the terms first, second, third etc. may be used herein to describe various elements, these elements should not be limited by these terms. These terms are only used to distinguish one element from another element. For example, a first element may be termed a second element and a second element may be termed a first element without departing from the teachings of the present invention.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements present.

The present invention will now be described more fully with reference to the accompanying drawings, in which exemplary embodiments of the invention are shown. In the drawings, the same elements are denoted by the same reference numerals, and a repeated explanation thereof will not be given. In the description of the present invention, certain detailed explanations of related art are omitted when it is deemed that they may unnecessarily obscure the essence of the invention. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

Hereinafter, the drawings illustrate a user equipment (UE). However, the UE may also be called a terminal, a mobile equipment (ME), a mobile station (MS), a user terminal (UT), a subscriber station (SS), a wireless device, a handheld device, or an access point (AT). In addition, the UE may be a portable device having a communication function, such as a cellular phone, a personal digital assistant (PDA), a smart phone, a wireless modem, a notebook computer, etc. or may be a fixed device such as a personal computer (PC) and on board equipment.

Figure 10:
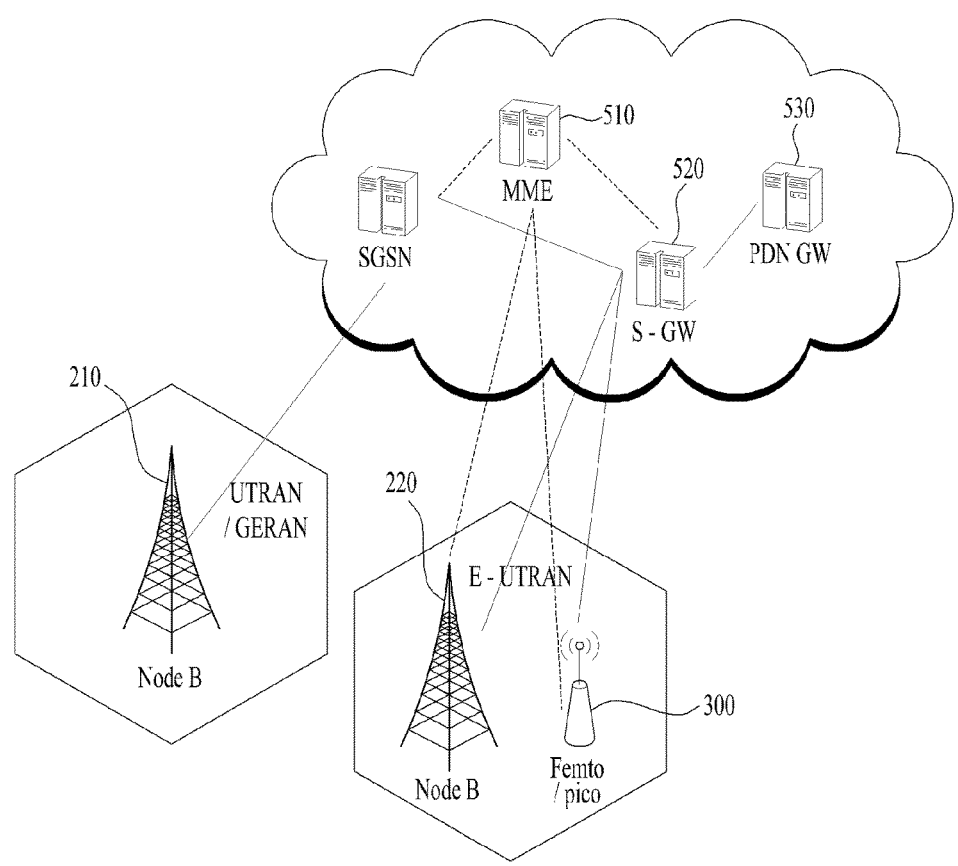
FIG. 10 is a structural diagram of an evolved mobile communication network.

FIG. 10 is a structural diagram of an evolved mobile communication network.

As one important feature of the network structure of FIG. 10, the network is based on a 2 tier model of an eNodeB 220 of an evolved UTRAN and a gateway (GW) of a core network. The eNodeB 200 has the same functions as those of a NodeB 210 and a radio network controller (RNC) of a conventional UMTS system, with slight differences, and the GW has a SGSN/GGSN function of the conventional system.

As another important feature of the network structure, a user plane and a control plane between an access network and a core network are exchanged via different interfaces. In the conventional UMTS system, one interface Iu is present between the RNC and the SGSN. On the other hand, a mobility management entity (MME) 510 for processing a control signal is separated from the GW, and thus, two interfaces of S1-MME and S1-U are used. The GW includes a serving-gateway (S-GW) 520 and a packet data network gateway (PDN-GW or P-GW) 530.

For $3^{rd}$ or $4^{th}$ generation mobile communication systems, there are continuous attempts to increase cell capacity in order to support an interactive service and a high capacity service such as multimedia, streaming, etc.

That is, according to demands for various high capacity transmission technologies in addition to development of communication and spread of multimedia technologies, a method of allocating more frequency resources are used to increase wireless capacity. However, in this case, there is a limit in allocating more frequency resources to a plurality of users using limited frequency resources.

In order to increase cell capacity, there has been an approach to use a high frequency band and to reduce a cell radius. A pico cell or a femto cell is advantageous in that a cell with a small cell radius is used, and thus, a higher band than a frequency used in a conventional cellular system can be used so as to transmit a larger amount of information. However, the pico cell or femto cell is disadvantageous in that more BSs need to be installed in the same area, and thus, high costs are needed.

Recently, as an approach to increase cell capacity using a small cell, a femto cell/pico cell has been proposed. The pico cell refers to a small cell having a smaller radius than a macro cell. The femto cell refers to a cell managed by a home eNodeB (HeNB). The pico cell is installed by a business provider and the femto cell is installed by a user. Thus, in 3GPP, it is assumed that the business provider cannot accurately detect presence of a femto cell.

Research has initially conducted into the femto cell/pico cell 300 named Home (e)NodeB in 3GPP in terms of RAN WG3. In this case, the eNodeB 220 or the NodeB 210 is relatively a macro cell. Hereinafter, when the NodeB 210 and the eNodeB 220 are each a macro cell, reference numeral 200 will be used therefor.

Throughout this specification, the present invention is described in terms of 3GPP terms. The term (e)NodeB is used when a NodeB and an eNodeB are stated together.

An interface indicated by dotted lines is used to transmit a control signal between the eNodeB 220 and the femto cell/pico cell 300, and the MME 510. In addition, an interface indicated by solid lines is used for transmission data of a use plane.

Figure 11:
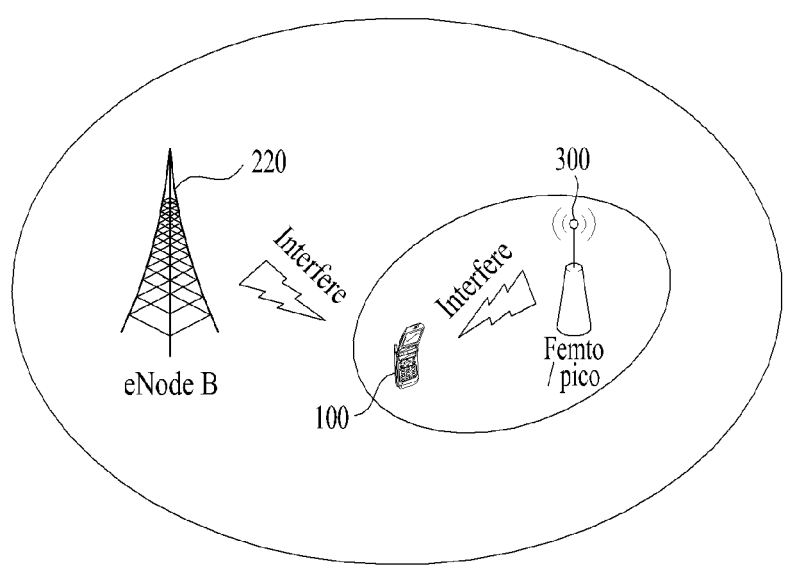
FIG. 11 illustrates a case in which a pico cell/femto cell coexists in macro cell coverage.

FIG. 11 illustrates a case in which a pico cell/femto cell coexists in macro cell coverage.

As illustrated in FIG. 11, when heterogeneous networks such as a pico cells/femto cell coexist in the macro cell coverage, problems arise in terms of interference therebetween.

That is, the pico cell or the femto cell is located in the coverage of the macro cell. In this situation, signals transmitted from cells interfere with each other with regard to a UE located at a boundary between overlapping cells.

As a first example, when a UE 100 that accesses the pico cell 300 is located at a pico cell boundary, the access to the pico cell 300 may be disconnected due to interference from the macro cell 200, which means that coverage of the pico cell 300 is reduced compared with what the business provider expects.

As a second example, when the UE 100 that access the macro cell 200 is located in an area of the femto cell 300, the access to the macro cell 200 may be disconnected due to interference from the femto cell 300, which means that a shadow area is generated within the macro cell 200.

The first example is referred to as a macro-pico issue, and the second example is referred to as macro-femto issue, which arise as important problems to be overcome in heterogeneous networks.

The most basic solution for this interference issue is to use different frequencies between heterogeneous networks. However, since frequencies are scarce and expensive resource, business providers do not like this solution via frequency division.

Thus, the 3GPP attempts to overcome this inter-cell interference issue via time division.

Accordingly, recently, the 3GPP has actively conducted research on enhanced inter-cell interference coordination (eICIC) as an interference coordination method.

A time division scheme introduced by LTE Release-10 is called eICIC, which is an evolved form of a conventional time division scheme. According to the time division scheme, when a cell causing interference is defined as an aggressor cell or a primary cell and an interfered cell is defined as a victim cell or a secondary cell, the aggressor cell or the primary cell stops data transmission in a specific subframe such that a UE maintains access to the victim cell or the secondary cell in the corresponding subframe. That is, according to the time division scheme, when macro cell-pico cell or macro cell-femto cell coexist, one BS temporally stops transmitting signals to a UE that is strongly interfered in a specific area, and thus, interference signals are barely transmitted.

With regard to the aforementioned macro-pico issue or the macro-femto issue, the macro cell may be the aggressor cell or the primary cell and the pico cell may be the victim cell or the secondary cell or, conversely, the pico cell may be the aggressor cell or the primary cell and the macro cell may be the victim cell or the secondary cell.

A specific subframe for which data transmission is stopped is referred to as an almost blank subframe (ABS). Except for necessary control information data is not transmitted in a subframe corresponding to the ABS. The necessary control information may be, for example, a CRS. According to the current 3GPP LTE/LTE-A standard, the CRS is present in OFDM symbols #0, #4, #7, and #11 in each subframe in the time axis.

As a broadcast service of a next-generation mobile communication system, multimedia broadcast/multicast service (MBMS) has been proposed.

FIG. 12 illustrates an example of an operation of eICIC.

As described above, currently, among inter-cell interference coordination methods, the method most discussed by the 3GPP is the eICIC.

As illustrated in FIG. 12(A), when macro and pico or macro and femto coexist, various cells may interfere with each other. In this environment, the eICIC in which an adjacent cell limits transmission thereof in some subframes to cancel/relieve interference may be performed. That is, according to the eICIC scheme, signals of adjacent cells causing interference are not transmitted to a UE to be strongly interfered in a restricted frame pattern area so as to ensure the reception quality performance of the UE.

FIG. 12(A) illustrates an example of an operation of the eICIC. A UE that crosses a pico BS with weak transmission power is strongly DL-interfered with a macro BS. In this case, when the macro BS performs silencing on DL transmission thereof in some subframes, the corresponding UE may receive a signal from the pico BS with a high SINR.

FIG. 12(B) illustrates an example of a muting pattern of a subframe for inter-cell interference coordination in terms of a subframe by a macro BS and a pico BS.

Here, the macro BS may perform silencing in every even subframe such that it is possible to schedule a UE at a pico cell boundary in every even subframe with a high SINR from a pico cell point of view. On the other hand, the pico BS may schedule a UE located in a center of the pico cell instead of a UE at a cell boundary in odd subframes in which the macro BS does not perform silencing.

Figure 13:
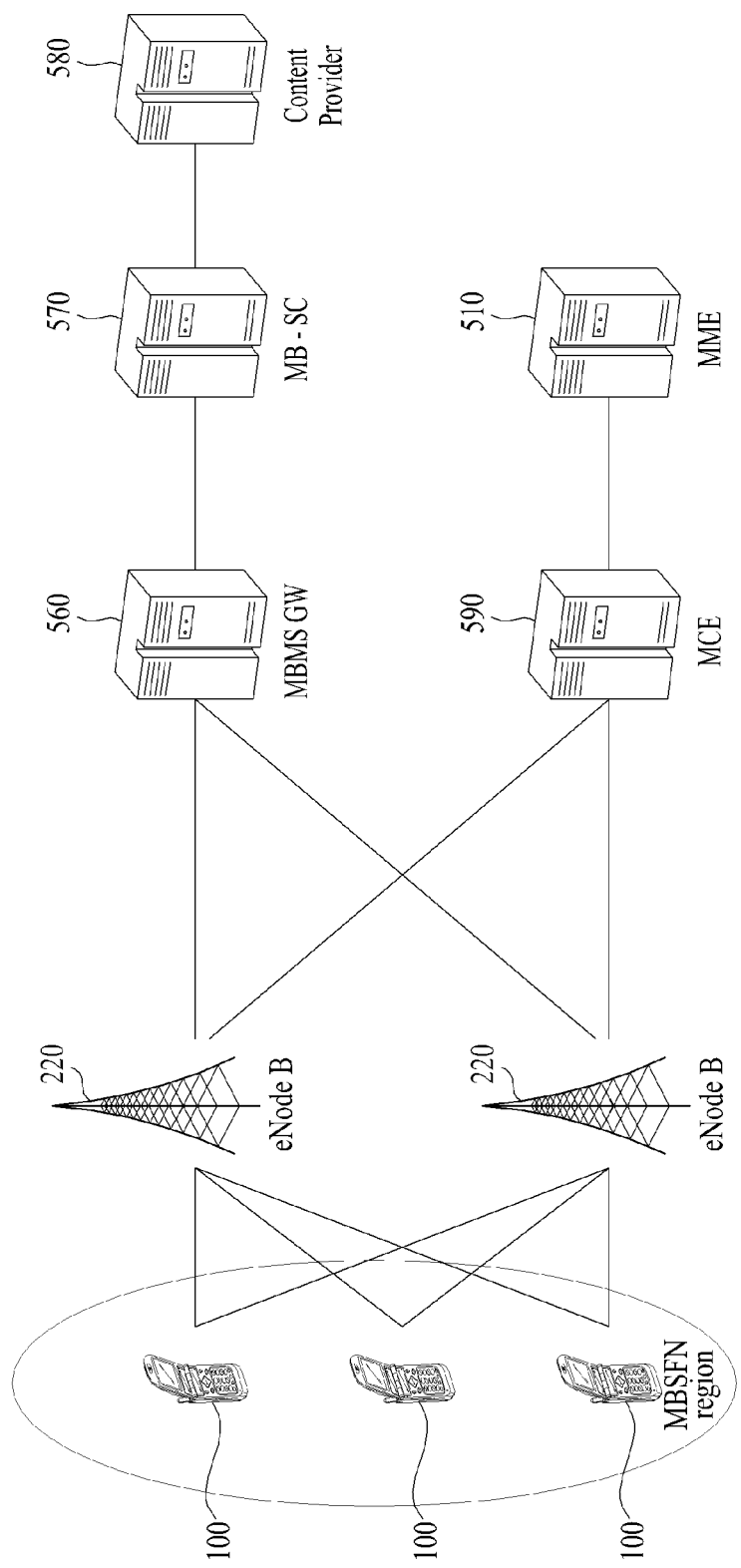
FIG. 13 illustrates a system for implementing multimedia broadcast/multicast service (MBMS).

FIG. 13 illustrates a system for implementing multimedia broadcast/multicast service (MBMS).

Figure 14:
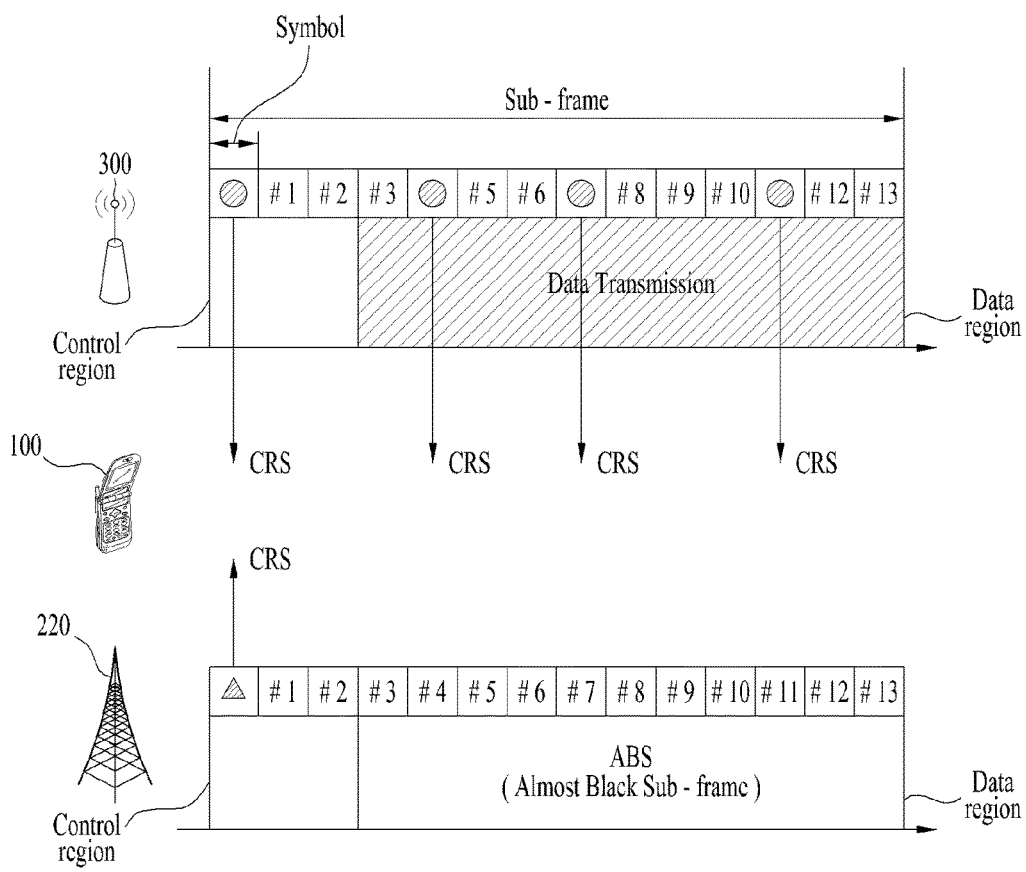
FIG. 14 is a diagram illustrating an example of eICIC for overcoming inter-cell interference.

As seen from FIG. 14, the system for implementing the MBMS includes an MBMS GW 560, an MB-SC 570, a content provider 580, and an MCE 590 in addition to the eNodeB 220 and the MME 510 illustrated in FIG. 10.

An MBMS single frequency network (MBSFN) for allowing a plurality of eNodeBs 220 to transmit the same data in the same form at the same time may be applied to one service area.

According to the MBMS, a streaming or background broadcast service or multicast service is provided to a plurality of UEs using a DL-dedicated MBMS bearer service. In this case, the MBMS service may be categorized into a multi-cell service for providing the same service to a plurality of cells and a single cell service provided to only one cell.

When a UE receives the multi-cell service, the UE may combine the same multi-cell service transmitted from plural cells via an MBSFN scheme and receive the service.

A subframe for transmitting the MBMS may be signaled to an MBSFN subframe to allow the UE to know the subframe.

FIG. 14 is a diagram illustrating an example of eICIC for overcoming inter-cell interference.

As seen from FIG. 14(A), a macro cell, i.e., the eNodeB 220 and the pico cell 300 exchange MBSFN subframe information through an X2 interface.

For example, the macro cell, that is, the eNodeB 220 adds the MBSFN subframe information and information about a subframe acting as an ABS to an MBSFN subframe info information element (IE) and transmits the MBSFN subframe info IE to the pico cell 300 through a request message based on the X2 interface.

The pico cell 300 also adds the MBSFN subframe information and information about a subframe acting as an ABS to an MBSFN subframe Info IE and transmits the MBSFN subframe Info IE through a request message based on the X2 interface.

Likewise, the macro cell, that is, the eNodeB 220 and the pico cell 300 may exchange the MBSFN subframe information through the X2 interface.

However, the macro cell, that is, the eNodeB 220 and the femto cell 300 have no X2 interface. In this case, in order to acquire the MBSFN subframe information of the macro cell, that is, the eNodeB 220, the femto cell 300 may acquire system information that is wirelessly broadcast from the macro cell, that is, the eNodeB 220 to acquire the MBSFN subframe information. In addition, the femto cell 300 may acquire the MBSFN subframe information of the macro cell, that is, the eNodeB 220 from a control station of a core network.

Alternatively, when the MBSFN subframe of the macro cell, that is, the eNodeB 220 is determined, the MBSFN subframe information may be applied to the femto cell 300 via operations and management (OAM).

FIG. 14(B) illustrates a subframe configured as an MBSFN by the pico cell 300. When the pico cell 300 configures the corresponding subframe as the MBSFN and informs the macro cell, that is, the eNodeB 220 of the corresponding subframe through the X2 interface, the macro cell 220 allows the corresponding subframe to act as an ABS.

The pico cell 300 performs data transmission in a data region of the corresponding subframe, and a CRS is transmitted in symbols #0, #4, #7, and #11.

On the other hand, when the eICIC is applied, the macro cell, that is, the eNodeB 220 does not transmit any data in the data region of the corresponding subframe so as to prevent interference. However, the macro cell, that is, the eNodeB 220 transmits only a CRS of the corresponding subframe.

The UE measures reference signal received power (RSRP) and reference signal received quality (RSRQ) using the CRSs transmitted from the macro cell, that is, the eNodeB 220 and the pico cell 300. For example, when a serving ell of the UE 100 is the macro cell and the pico cell 300 is a neighbor cell, the UE measures RSRP and RSRQ of the serving cell through the CRS from the macro cell 220 and measures RSRP and RSRQ of the neighbor cell through the CRS from the pico cell 300.

According to the current 3GPP LTE/LTE-A standard, a CRS is present in OFDM symbols #0, #4, #7, and #11 in each subframe in the time axis. According to the eICIC of the LTE-A Rel-10, for compatibility with an LTE UE, a separate subframe is not applied or interference cancellation is not mandatorily applied, but instead, an ABS method is used. According to the ABS method, remaining data except for minimum necessary signals including a CRS is not allocated to an ABS. In addition, remaining CRSs except for a first CRS are removed from an MBSFN ABS subframe, thereby preventing interference between CRSs in fourth, seventh, and eleventh OFDM symbol periods containing remaining CRSs except for the first CRS as a control data region.

FIGS. 15A to 15D illustrate an example of a subframe acting as an ABS.

Figure 15A:
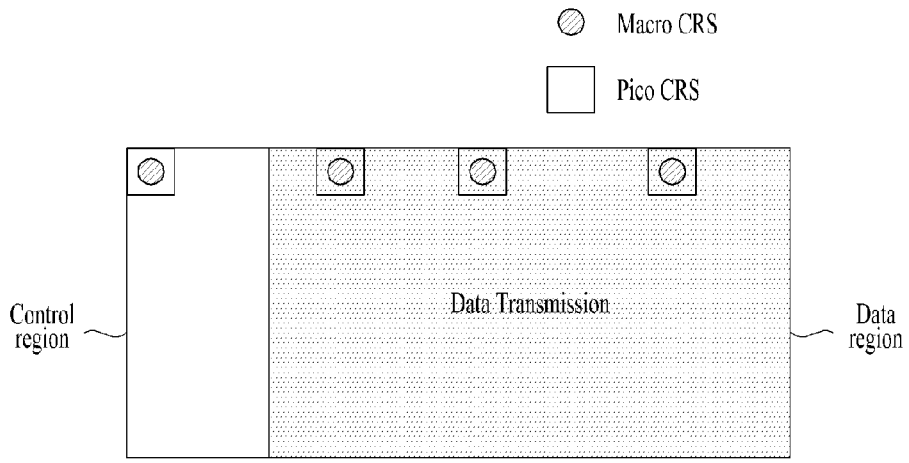
FIGS. 15A to 15D illustrate an example of a subframe acting as an almost blank subframe (ABS).

FIG. 15A illustrates the relationship between a macro cell and a pico cell in a subframe acting as a non-MBSFN, that is, a normal ABS (a normal ABS subframe). The macro cell transmits data in a data region of the corresponding subframe and transmits CRSs through symbols #0, #4, #7, and #11. When CRSs are transmitted through the same symbol, the CRSs collide with each other to interfere with each other.

Figure 15B:
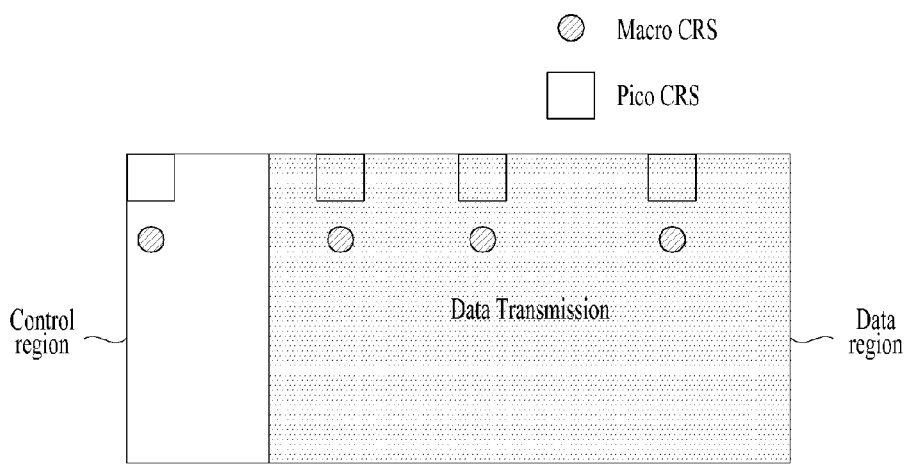

FIG. 15B illustrates a relationship between a macro cell and a pico cell in a subframe acting as a non-MB SFN, that is, a normal subframe. The macro cell transmits data in a data region of the corresponding subframe and transmits CRSs through symbols #0, #4, #7, and #11. In this case, when the CRSs are transmitted through symbols #0, #4, #7, and #11, different resources are used, thereby preventing collision between the CRSs.

Figure 15C:
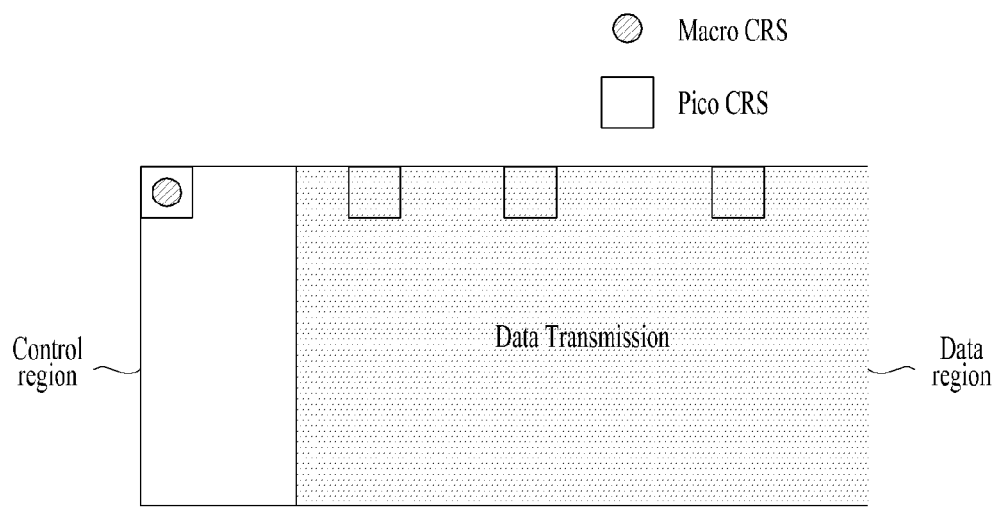

FIG. 15C illustrates a relationship between a macro cell and a pico cell in a subframe configured as an MBSFN by the pico cell 300. The pico cell 300 transmits data in a data region of the subframe configured as the MBSFN. In addition, the pico cell 300 transmits a CRS through symbols #0, #4, #7, and #11 in a control region of the subframe. On the other hand, the macro cell 220 does not transmit data in the data region when eICIC is applied. However, the macro cell 220 transmits a CRS through symbol #0. That is, with regard to an MBSFN ABS subframe, remaining CRSs except for a first CRS are further removed from an MBSFN ABS subframe, thereby preventing interference between CRSs in fourth, seventh, and eleventh OFDM symbol periods containing remaining CRSs except for the first CRS. Accordingly, only CRSs transmitted through symbol #0 collide to interfere with each other.

Figure 15D:
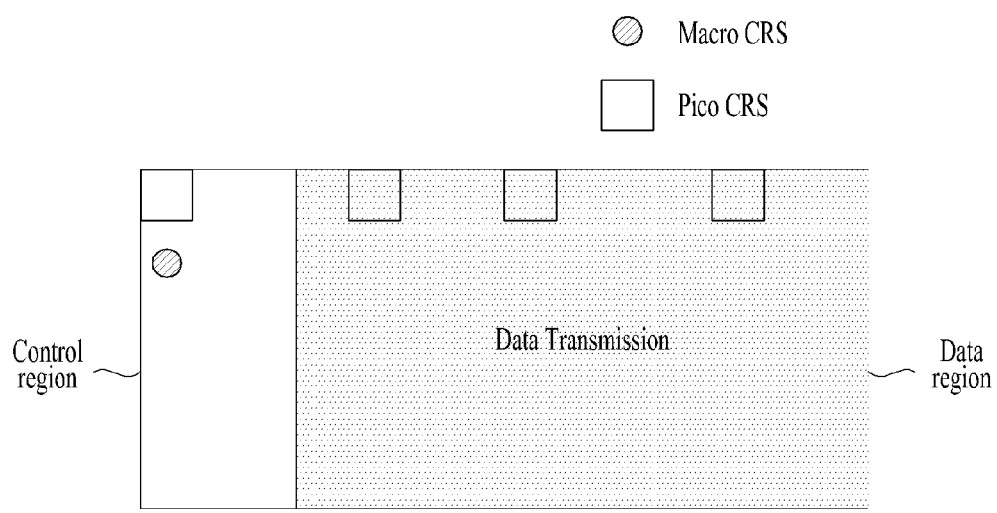

FIG. 15D illustrates a relationship between a macro cell and a pico cell in a subframe configured as an MBSFN by the pico cell 300. The pico cell 300 transmits data in a data region of the subframe configured as the MBSFN. In addition, CRSs are transmitted through symbols #0, #4, #7, and #11 in a control region of the subframe. On the other hand, the macro cell 220 does not transmit data in the data region when eICIC is applied. However, the macro cell 220 transmits a CRS through symbol #0 in the subframe. In this case, when the CRSs are transmitted in symbol #0, different resources are used, thereby preventing collision between the CRSs.

As described above, when the macro cell 220 and the pico cell 300 coexist, if a UE receives a CRS from the pico cell 300 and measures RSRP/RSRQ, a CRS location of the macro cell 220 and a CRS location of the pico cell 300 are the same in FIG. 14A, and thus, the CRSs overlap to interfere with each other, thereby remarkably degrading transmission performance of a signal.

FIG. 16 illustrates an example in which a CRS of a macro BS and a CRS of a pico BS overlap.

In FIG. 16(A), the macro BS and the pico BS overlap but locations of CRSs differ.

An upper diagram of FIG. 16(A) illustrates a symbol 1510 of an LTE/LTE-A system.

In the same subframe, a signal 1511 (e.g., a PDCCH and a PDSCH) of the macro BS and a signal 1512 (e.g., a PDCCH and a PDSCH) of the pico BS overlap.

The pico BS transmits CRSs 1513, 1514, 1515, and 1516 in symbols #0, #4, #7, and #11. In addition, the macro BS also transmits CRSs 1517, 1518, and 1519 in symbols #4, #7, and #11.

As illustrated in FIG. 16(A), the CRS of the pico BS and the CRS of the macro BS do not overlap.

In this case, channel estimation performed by a UE using the CRS is not accurate, and a CRS of an opposite side is present in a data region of the UE, thereby degrading performance.

FIG. 16(B) illustrates an example in which locations of CRSs overlap while coverage of a macro BS and coverage of a pico BS overlap.

In the same subframe, a signal 1521 (e.g., a PDCCH and a PDSCH) of the macro BS and a signal 1522 (e.g., a PDCCH and a PDSCH) of the pico BS overlap.

In addition, the pico BS transmits CRSs 1523, 1524, 1525, and 1526 in symbols #0, #4, #7, and #11. In addition, the macro BS also transmits CRSs 1527, 1528, and 1529 in symbols #4, #7, and #11. In this case, as illustrated in FIG. 16(B), the CRS of the pico BS and the CRS of the macro BS overlap.

In this case, channel estimation performed by a UE using the CRS is not accurate, and a CRS of an opposite side is present in a data region of the UE, thereby degrading performance.

In addition, a CRS in a PDSCH is not transmitted in an adjacent macro cell in which an MB SFN is configured, as illustrated in FIG. 15, and thus, only a CRS in a first OFDM symbol in one subframe can be used. Accordingly, it is disadvantageous that a period for measurement needs to be ensured to calculate an average value of CRSs in order to accurately measure the CRS.

In order to reduce load of a macro cell while minimizing influence due to inter-cell interference and achieving expansion of coverage of a pico cell, research needs to be conducted into interference coordination and a method for accurate measurement therefor. This is because a network system request s appropriate resource allocation and handover between cells based on only a measurement report performed by a UE.

Accordingly, hereinafter, a method for measuring cell quality in a situation in which a cell list proposed by the present invention is present or not present, in particular, for RSRP/RSRQ and RLM will be described in greater detail. In addition, as a method for accurate measurement of a UE using four CRSs for a serving cell and a neighbor cell in a situation in which an MBSFN is configured, appropriate methods according to a synchronous case and an asynchronous case will be described below.

Figure 17:
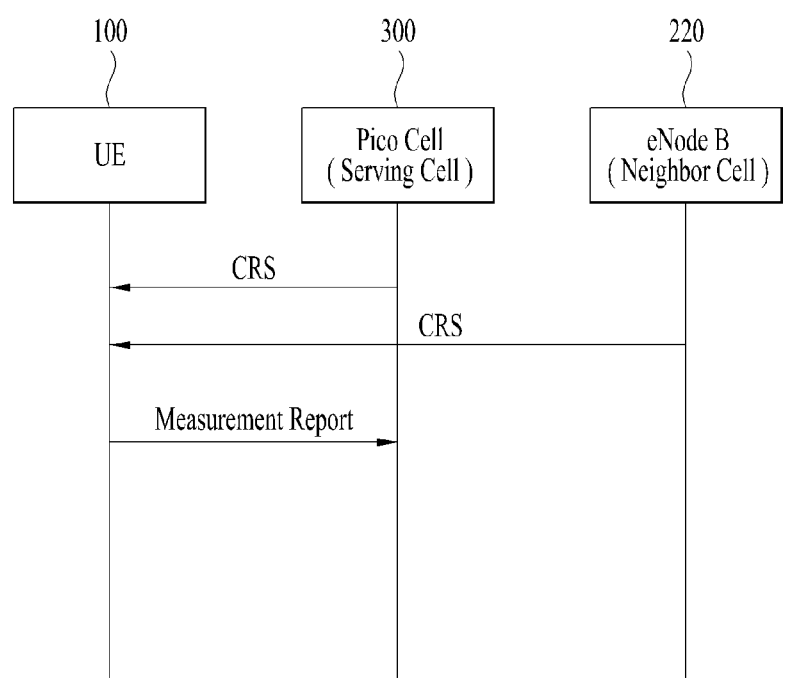
FIG. 17 illustrates measurement of RSRP and RSRQ through a CRS.

FIG. 17 illustrates measurement of RSRP and RSRQ through a CRS.

As seen from FIG. 17, with regard to the UE 100, when the pico cell 300 is a serving cell and a macro cell, that is, the eNodeB 220 is a neighbor cell, if the serving cell and the neighbor cell transmit CRSs, respectively, the UE 100 measures RSRP and RSRQ through the CRS and transmits the measurement result to the pico cell 300 that is a serving cell.

In order for the UE to perform measurement, the serving cell transmits necessary information to the UE, which will be described below.

Figure 19:
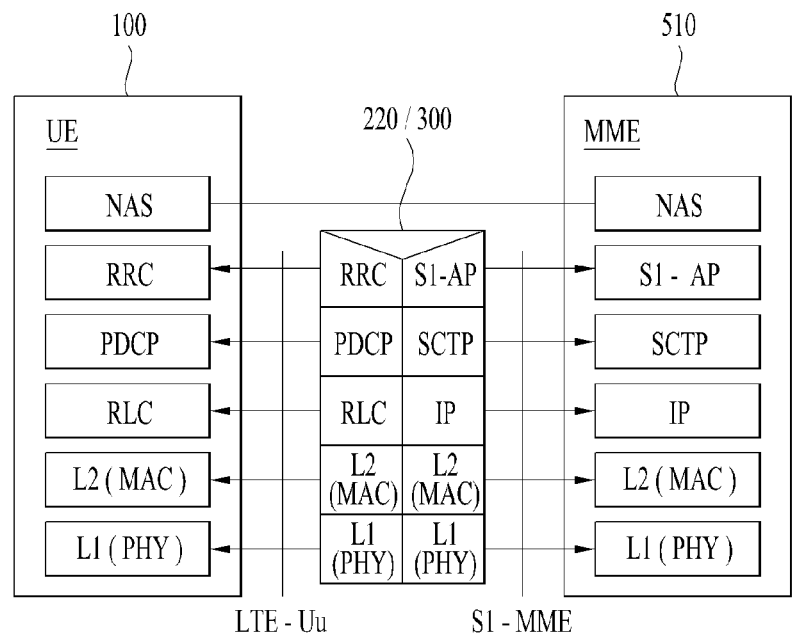
FIG. 19 illustrates a control plane and a user plane of a radio interface protocol architecture between a UE and an evolved universal terrestrial radio access network (E-UTRAN) based on a 3GPP radio access network standard.
Figure 20:
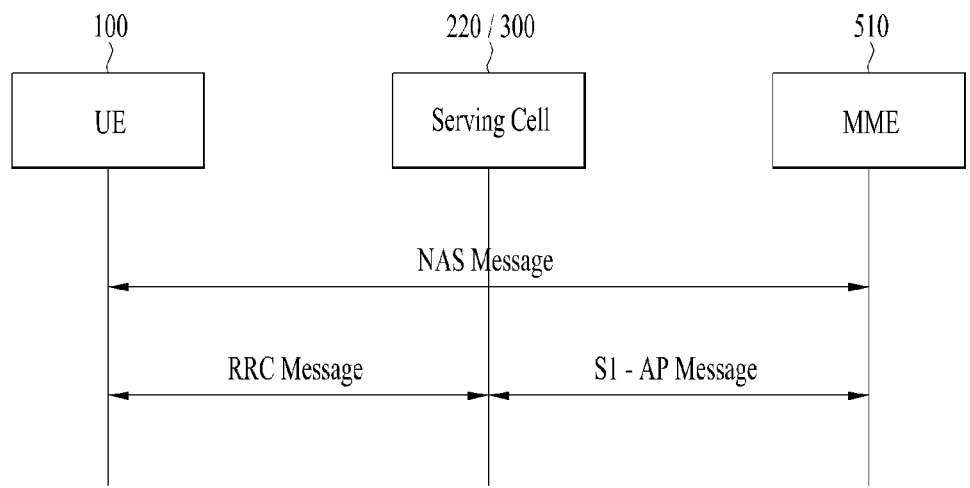
FIG. 20 illustrates a message transmitted and received based on the protocol illustrated in FIG. 19.

FIG. 18 illustrates a process for transmitting information for measurement to a UE. FIG. 19 illustrates a control plane and a user plane of a radio interface protocol architecture between a UE and an evolved universal terrestrial radio access network (E-UTRAN) based on a 3GPP radio access network standard. FIG. 20 illustrates a message transmitted and received based on the protocol illustrated in FIG. 19.

As seen from FIG. 18(A), the UE 100 establishes radio resource control (RRC) connection with the pico/femto cell 300 as a serving cell.

Before describing the RRC, a protocol architecture between the UE 100, the serving cell 220 or 300, and the MME 510 will be described below with reference to FIG. 19.

The protocol architecture between the UE 100, the serving cell 220 or 300, and the MME 510 may be categorized into a control plane and a user plane. The control plane is a path through which the UE and the network transmit control messages to manage calls, and the user plane is a path through which data generated from an application layer, for example, voice data or Internet packet data is transmitted.

A physical (PHY) layer at Layer 1 (L1) provides an information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated using orthogonal frequency division multiple access (OFDMA) for Downlink (DL) and using single carrier frequency division multiple access (SC-FDMA) for Uplink (UL).

The MAC layer at Layer 2 (L2) provides service to a higher layer thereof, i.e., a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A radio resource control (RRC) layer at the lowest part of Layer 3 (or L3) is defined only in the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A non-access stratum (NAS) layer above the RRC layer performs functions including session management and mobility management.

As seen from FIG. 20, messages transmitted between the UE 100 and the serving cell, for example, the eNodeB 220 or the pico/femto cell 300 are based on the RRC protocol. Messages transmitted between the serving cell 220 or 300 and the MME 510 are based on an S1 application protocol (S1-AP).

Messages transmitted between the UE 100 and the MME 510 are based on a NAS protocol. The messages based on the NAS protocol are encapsulated and transmitted as the message based on the RRC protocol and the S1-AP message.

Hereinafter, an RRC state and RRC connection will be described.

The RRC state refers to whether an RRC layer of a UE is logically connected to an RRC layer of the E-UTRAN. A state in which the RRC layers are logically connected is referred to as an RRC_CONNECTED state. A state in which the RRC layers are not logically connected is referred to as an RRC_IDLE state. Since RRC connection is present in a UE in an RRC_CONNECTED state, the E-UTRAN can recognize presence of the corresponding UE on a cell basis and thus can effectively control the UE. On the other hand, the E-UTRAN cannot recognize a UE in an RRC_IDLE state and a core network (CN) that is a larger regional area than a cell manages the UC on a tracking area basis. That is, the presence of the UE in an RRC_IDLE state is recognized on a large regional area basis only. In order to receive a general mobile communication service such as voice or data, the UE needs to transition to a RRC_CONNECTED state.

When a user initially powers on a UE, the UE searches for an appropriate cell and then is maintained in the RRC_IDLE state in the corresponding cell. When RRC connection needs to be established, the UE in the RRC_IDLE state establishes RRC connection with the E-UTRAN via an RRC connection procedure to transition to an RRC_CONNECTED state. The UE in the RRC_IDLE state needs to establish RRC connection in various situations, for example, when UL data transmission is required by user call attempt, etc. or response message transmission is required when the UE receives a paging message from the E-UTRAN.

In order to transition to the RRC_CONNECTED state, the UE 100 performs an RRC connection procedure. As illustrated in FIG. 16(A), the UE 100 transmits an RRC connection request message to a serving cell, that is, the pico/femto cell 300.

When the UE 100 receives an RRC connection setup message in response to the RRC connection request message, the UE 100 transmits an RRC connection setup complete message to the serving cell.

After transitioning to the RRC_CONNECTED state, when RRC connection reconfiguration is required, the serving cell, that is, the pico/femto cell 300 transmits an RRC connection reconfiguration message to the UE 100, as illustrated in FIG. 18 (B).

The RRC connection reconfiguration message may include, for example, radio resource configuration dedicated IE and measurement configuration, as illustrated in FIG. 18 (B). Table 1 below shows information included in the RRC connection reconfiguration message.

TABLE 1 measConfig mobilityControlInfodedicatedInfoNASList
radioResourceConfigDedicatedsecurityConfigHOnonCriticalExtension The RRC connection reconfiguration message includes radio resource configuration dedicated IE, measurement configuration, etc.

The radio resource configuration dedicated IE is used to establish/modify/release a radio bearer or to modify MAC configuration. The radio resource configuration dedicated IE includes subframe pattern information. The subframe pattern information is information regarding a time domain measurement resource restriction pattern for measuring RSRP and RSRQ of a primary cell (PCell).

The radio resource configuration dedicated IE includes fields shown in Table 2 below.

TABLE 2

- RadioResourceConfigDedicated- measSubframePatternPCell-r10

The field 'RadioResourceConfigDedicated' includes the following factors.

TABLE 3

Descriptions of field 'RadioResourceConfigDedicated'
logicalChannelConfig
For signaling radio bearers (SRBs), choice is used to indicate whether logical channel configuration is explicitly signaled or set to default logical channel configuration for SRB1.
logicalChannelIdentity
A logical channel identity for both UL and DL.
mac-MainConfig
Choice that is used to indicate whether the mac-MainConfig is explicitly signaled or set to default MAC main configuration.
measSubframePattern-Serv
Time domain measurement resource restriction pattern for the serving cell measurements (RSRP, RSRQ, and radio link monitoring).
physicalConfigDedicated
Default dedicated physical configuration.
rlc-Config
For SRBs, choice is sued to indicate whether RLC configuration is explicitly signaled or set to values defined in default RLC configuration for SRB1 or SRB2. An RLC acknowledge mode (AM) is an only applicable RLC mode for SRB1 and SRB2. An E-UTRAN does not reconfigure the RLC mode of DRBs except when full configuration option is used and may reconfigure UM RLC sequence number (SN) field size only upon handover within the E-UTRA or upon the first reconfiguration after RRC connection reestablishment.
sps-Config
Default SPS configuration.
srb-Identity
1 is applicable for SRB1 only.
2 is applicable for SRB2 only.

As described above, a field 'RadioResourceConfigDedicated' in the RRC connection reconfiguration message may include measSubframePatternPCell or measSubframePattern-Serv indicating a time domain measurement resource restriction pattern for measurements (RSRP and RSRQ) of a primary cell (or a serving cell).

Measurement Config includes IE shown in Table 4 below.

TABLE 4

MeasConfig ::= -- Measurement objects measObjectToRemoveList measObjectToAddModList Measurement objects IE includes measObjectToRemoveList indicating a list of measObjects to be removed and measObjectToAddModList indicating a list to be newly added or modified.

measObject includes MeasObjectCDMA2000, MeasObjectEUTRA, MeasObjectGERAN, etc. according to communication technology.

MeasObjectEUTRA IE includes information applied for intra-frequency or inter-frequency for cell measurement of the E-UTRA. MeasObjectEUTRA IE is shown in Table 5 below.

TABLE 5

1) MeasObjectEUTRA- neighCellConfig-
measSubframePatternConfigNeigh-r102)
MeasSubframePatternConfigNeigh-r10 measSubframePatternNeigh-r10
measSubframeCellList-r10

MeasObjectEUTRA IE will be described below in detail.

TABLE 6

Descriptions of field 'MeasObjectEUTRA'
blackCellsToAddMoList
List of cells to be added or modified in black list of cells.
blackCellsToRemoveList
List of cells to be removed from black list of cells.
carrierFreq
Identifies E-UTRA carrier frequency for which configuration is valid.
neighCellConfig
Configuration information of neighbor cell.
measCycleSCell parameter: $T_{measure\_scc}$
This parameter is used only when an SCell is configured on a frequency indicated by measObject and is deactivated.
measSubframeCellList
List of cells for which measSubframePatternNeigh is applied. If not included, a UE applies time domain measurement resource restriction pattern for all neighbor cells.
measSubframePatternNeigh
Time domain measurement resource restriction pattern applicable to RSRP and RSRQ measurements of neighbor cells on a carrier frequency indicated by carrierFreq.

As described above, MeasObjectEUTRA IE includes neighbor cell configuration information (i.e., NeighCellConfig), a time domain measurement resource restriction pattern applied to measure RSRP and RSRQ for a neighbor cell (i.e., measSubframePatternNeigh), a cell list to which the pattern is applied (i.e., measSubframeCellList).

The time measurement resource restriction pattern configured for the measurement cell indicates that at least one subframe per measurement radio frame is used for measurement.

The measurement should not be performed on any subframe that is different from the subframe indicated by the time measurement resource restriction pattern configured for measurement cell.

The neighbor cell configuration information (i.e., NeighCellConfig) includes information associated with MBSFN of a neighbor and information associated with TDD UL/DL configuration.

TABLE 7

Descriptions of field 'NeighCellConfig'
neighCellConfig: which is used to provide information associated
with MBSFN of a neighbor and information associated with TDD
UL/DL configuration. 00: At a specific frequency, some neighbor
cells instead of all neighbor cells have the same MBSFN subframe
allocation configuration as a serving cell. 10: At a
specific frequency, all neighbor cells have the same MBSFN subframe
allocation configuration as a serving cell. 01: All neighbor cells
do not have MBSFN subframe configuration. 11: At a specific frequency,
compared with a serving cell, a neighbor cell has different UL/DL
allocation configuration.

Figure 21:
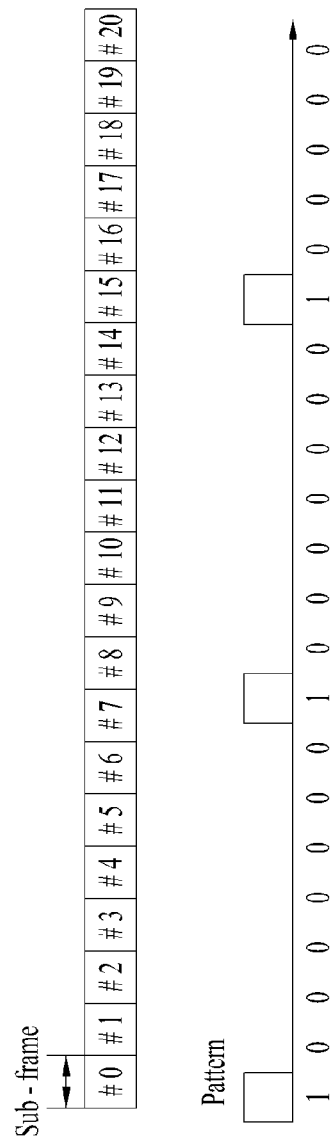
FIG. 21 illustrates an example of a time measurement resource restriction pattern.

FIG. 21 illustrates an example of a time measurement resource restriction pattern.

As seen from FIG. 21(A), the aforementioned time measurement resource restriction pattern (i.e., measSubframe-PatternPCell or measSubframePatternNeigh) may indicate a subframe to which restriction is applied or a subframe to which restriction is not applied when the UE 100 performs measurement. In this case, the subframe to which restriction is applied to be used for measurement may be represented by 1 and the subframe to which restriction is not applied to be used for measurement may be represented by 0.

FIG. 22 illustrates an example of measurement of RSRP and RSRQ.

Referring to FIG. 22(A), the UE 100 is located in coveratge of the pico cell 300 and coverage of a first macro cell eNodeB 221 and a second macro cell eNodeB 222. In this case, a serving cell is the pico cell 300 and a neighbor cell is the first macro cell eNodeB 221 and the second macro cell eNodeB 222.

In this situation, FIG. 22(B) illustrates a subframe configured as an MBSFN by the pico cell 300. When the pico cell configures the corresponding subframe as an MBSFN and informs the first macro cell eNodeB 221 and the second macro cell eNodeB 222 of the corresponding subframe via an X2, the first and second macro cells 221 and 222 operate the corresponding subframe as an ABS.

The pico cell 300 transmits data in a data region of the corresponding subframe and transmits a CRS in a control region and the data region. The CRS is transmitted on symbols #0, #4, #7, and #11. On the other hand, the first and second macro cells 221 and 222 operates the corresponding subframe as an ABS, and thus, do not transmit any data in the data region, thereby preventing interference. However, the first and second macro cells 221 and 222 transmit CRSs on symbols #0, #4, #7, and #11 according to a non-MBSFN ABS and an MBSFN ABS.

As described above, the UE 100 receives Radio Resource Configuration Dedicated IE and Measurement Config from the pico cell 300.

In this case, Radio Resource Configuration Dedicated IE includes measSubframePattern-Serv as described above. In addition, as described above, Measurement Config includes neighCellConfig indicating the neighbor cell configuration information, measSubframePatternNeigh indicating the time measurement resource restriction pattern used to measure RSRP and RSRQ of a neighbor cell, and measSubframe-CellList indicating a list of cells to which measSubframe-PatternNeigh is applied.

First, the UE 100 checks measSubframePattern-Serv in order to measure the serving cell, that is, the pico cell 300. When the illustrated subframe is identified as a subframe to which a restriction pattern is applied according to measSubframePattern-Serv, the UE 100 receives CRSs on symbols #0, #4, #7, and #11 of the illustrated subframe from the serving cell, that is, the pico cell 300 and performs measurement.

The UE 100 checks Measurement Config in order to measure the neighbor cell, that is, the first and second macro cells 221 and 222. Hereinafter, it is assumed that the subframe illustrated in FIG. 20(B) is a subframe to which restriction is applied for neighbor cell measurement according to measSubframePatternNeigh in Measurement Config and the cell to which the restriction is applied is known as the first and second macro cells 221 and 212 according to measSubframeCellList.

Likewise, when the illustrated subframe is a subframe to be measured according to measSubframePattern-Serv and measSubframePattern-Neigh, the UE 100 receives a CRS from the serving cell, that is, the pico cell 300, and receives CRSs from the neighbor cell, that is, the first and second macro cells 221 and 222 and performs measurement.

However, in this case, the subframe is operated as an ABS by the neighbor cell, that is, the first and second macro cells 221 and 222, and thus, any data is not received in a data region.

During measurement of RSRP and RSRQ, the RSRQ depends upon an SINR. That is, the RSRQ is defined as (N×RSRP)/received signal strength indicator (RSSI), where N indicates the number of RBs in an RSSI measurement band and RSSI indicates intensity of received signal. That is, the RSRQ refers to intensity of actual reference signal obtained by removing interference and noise from the received signal.

Thus, when the illustrated subframe is operated as an ABS by the neighbor cell, that is, the first and second macro cells 221 and 222, and any data is not transmitted in a data region, RSRQs measured in the serving cell and the neighbor cell are almost the same such that a cell with excellent RSRQ cannot be identified. As a result, cell selection or cell reselection cannot be accurately performed.

Accordingly, when subframes restricted according to measSubframePattern-Serv and measSubframePattern-Neigh are configured to be the same, there is a serious limit in cell selection or cell reselection via RSRP and RSRQ by a UE.

Hereinafter, accuracy required to measure RSRP and RSRQ will be described.

First, accuracy of the RSRP may be categorized into absolute accuracy and relative accuracy, which will be described below in greater detail.

First, the absolute accuracy will now be described. The absolute accuracy is required to measure a cell that operates at the same frequency as a serving cell when a time domain measurement resource restriction pattern is applied.

In this case, when a measurement cell transmits a CRS from one antenna port, two antenna ports, or four antenna ports, the required absolute accuracy is stated below:

RSRP|dBm≥−127 dBm for bands 1, 4, 6, 10, 11, 18, 19, 21, 24, 33, 34, 35, 36, 37, 38, 39, 40, 42, and 43;

RSRP|dBm≥−126 dBm for bands 9 and 41;

RSRP|dBm≥−125 dBm for bands 2, 5, and 7; and

RSRP|dBm≥−124 dBm for bands 3, 8, 12, 13, 14, 17, and 20.

This is shown in Table 8 below.

TABLE 8

| Parameter | Unit | accuracy [dB] Normal Condition | accuracy [dB] Extreme Condition | Conditions Bands 1, 4, 6, 10, 11, 18, 19, 21, 24, 33, 34, 35, 36, 37, 38, 39, 40, 42, 43 Io | Bands 2, 5, 7 Io | Bands 3, 8, 12, 13, 14, 17, 20 Io | Bands 9, 41 Io |
|---|---|---|---|---|---|---|---|
| RSRP for $Es/I_{ot} \geq [-4]$ dB | dBm | ±6 | ±9 | −121 dBm/15 kHz ... −70 dBm/$BW_{Channel}$ | −119 dBm/15 kHz ... −70 dBm/$BW_{Channel}$ | −118 dBm/15 kHz ... −70 dBm/$BW_{Channel}$ | −120 dBm/15 kHz ... −70 dBm/$BW_{Channel}$ |
| RSRP for $Es/I_{ot} \geq [-4]$ dB | dBm | ±8 | ±11 | −70 dBm/$BW_{Channel}$ ... −50 dBm/$BW_{Channel}$ | −70 dBm/$BW_{Channel}$ ... −50 dBm/$BW_{Channel}$ | −70 dBm/$BW_{Channel}$ ... −50 dBm/$BW_{Channel}$ | −70 dBm/$BW_{Channel}$ ... −50 dBm/$BW_{Channel}$ |

Io: Io is defined over REs in subframes indicated by the time measurement resource restriction pattern applied to measure RSRP.

The relative accuracy is also required to measure a cell that operates at the same frequency as a serving cell when a time domain measurement resource restriction pattern is applied.

In this case, when a measurement cell transmits a CRS from one antenna port, two antenna ports, or four antenna ports, the required relative accuracy is stated below:

RSRP1,2|dBm≥−127 dBm for bands 1, 4, 6, 10, 11, 18, 19, 21, 24, 33, 34, 35, 36, 37, 38, 39, 40, 42, and 43;

RSRP1,2|dBm≥−126 dBm for bands 9 and 41;

RSRP1,2|dBm≥−125 dBm for bands 2, 5, and 7; and

RSRP1,2|dBm≥−124 dBm for bands 3, 8, 12, 13, 14, 17, and 20, and dBm is a unit for indicating power (Watt) and 1 mW=0 dBm is satisfied.

This is shown in Table 9 below

Hereinafter, RSRQ will be described below.

Absolute accuracy of the RSRQ is also required to measure a cell that operates at the same frequency as a serving cell when a time domain measurement resource restriction pattern is applied.

In this case, when a measurement cell transmits a CRS from one antenna port, two antenna ports, or four antenna ports, the required absolute accuracy is stated below:

RSRP|dBm≥−127 dBm for bands 1, 4, 6, 10, 11, 18, 19, 21, 24, 33, 34, 35, 36, 37, 38, 39, 40, 42, and 43

RSRP|dBm≥−126 dBm for bands 9 and 41

RSRP|dBm≥−125 dBm for bands 2, 5, and 7

RSRP|dBm≥−124 dBm for bands 3, 8, 12, 13, 14, 17, and 20.

This is shown in Table 10 below.

TABLE 9

| Parameter | Unit | accuracy [dB] Normal Condition | accuracy [dB] Extreme condition | Conditions Bands 1, 4, 6, 10, 11, 18, 19, 21, 24, 33, 34, 35, 36, 37, 38, 39, 40, 42, 43 Io | Bands 2, 5, 7 Io | Bands 3, 8, 12, 13, 14, 17, 20 Io | Bands 9, 41 Io |
|---|---|---|---|---|---|---|---|
| RSRP for $Es/I_{ot} \geq$ [TBD] dB | dBm | ±2 | ±3 | −121 dBm/15 kHz ... −50 dBm/$BW_{Channel}$ | −119 dBm/15 kHz ... −50 dBm/$BW_{Channel}$ | −118 dBm/15 kHz ... −50 dBm/$BW_{Channel}$ | −120 dBm/15 kHz ... −50 dBm/$BW_{Channel}$ |
| RSRP for $Es/I_{ot} \geq [-4]$ dB | dBm | ±3 | ±3 | −121 dBm/15 kHz ... −50 dBm/$BW_{Channel}$ | −119 dBm/15 kHz ... −50 dBm/$BW_{Channel}$ | −118 dBm/15 kHz ... −50 dBm/$BW_{Channel}$ | −120 dBm/15 kHz ... −50 dBm/$BW_{Channel}$ |

TABLE 10

| Parameter | Unit | Accuracy [dB] Normal Condition | Accuracy [dB] Extreme Condition | Conditions Bands 1, 4, 6, 10, 11, 18, 19, 21, 24, 33, 34, 35, 36, 37, 38, 39, 40, 42, 43 Io | Bands 2, 5, 7 Io | Bands 3, 8, 12, 13, 14, 17, 20 Io | Bands 9, 41 Io |
|---|---|---|---|---|---|---|---|
| RSRQ when RSRP ≥ $Es/I_{ot}$ = |TBD| dB | dBm | ±2.5 | ±4 | −121 dBm/15 kHz ... −50 dBm/$BW_{Channel}$ | −119 dBm/15 kHz ... −50 dBm/$BW_{Channel}$ | −118 dBm/15 kHz ... −50 dBm/$BW_{Channel}$ | −120 dBm/15 kHz ... −50 dBm/$BW_{Channel}$ |
| RSRQ when RSRP ≥ $Es/I_{ot}$ = [−4] dB | dBm | ±3.5 | ±4 | −121 dBm/15 kHz ... −50 dBm/$BW_{Channel}$ | −119 dBm/15 kHz ... −50 dBm/$BW_{Channel}$ | −118 dBm/15 kHz ... −50 dBm/$BW_{Channel}$ | −120 dBm/15 kHz ... −50 dBm/$BW_{Channel}$ |

As described above, a UE needs to measure RSRQ only in a subframe indicated by measSubframePattern-Serv and measSubframePattern-Neigh. Needless to say, even if RSRP can be measured in another subframe, the RSRP is measured only in the indicated subframe for actual requirements, generally.

It is difficult to satisfy the aforementioned absolute accuracy and the relative accuracy using only one CRS. Accordingly, a more effective measurement method is required to accurately measure RSRP/RSRQ.

Thus, a measurement method for situations when the cell list proposed by the present invention is present and is not present, in particular, a method of measuring cell quality for RSRP/RSRQ and RLM will be described in greater detail. In addition, an appropriate method for accurate measurement using four CRSs with regard to a serving cell and neighbor cells by a UE when an MBSFN is configured will be described in terms of a synchronous case and an asynchronous case.

FIG. 23 illustrates a method for more effective measurement.

FIG. 23 is almost the same as FIG. 22. Thus, the method of FIG. 23 will be described in terms of differences from FIG. 22, and thus, the above description of FIG. 22 is applied to the method of FIG. 23.

In terms of the differences, the neighbor configuration information, that is, neighCellConfig is configured as '00'. Thus, when MBSFN configuration of the first macro cell 221 is not known or is not explicitly indicated (that is, when a cell having the same MBSFN configuration as a serving cell among neighbor cells, that is, the first and second macro cells 221 and 222 is not known), even if a subframe to which restriction is applied according to measSubframePattern-Neigh is applied to the first macro cell 221 according to a command indicated by measSubframeCellList, the UE 100 determines the subframe is not configured as the MBSFN subframe and performs measurement.

In other words, when it is not clear that the illustrated subframe is actually configured as an MBSFN subframe by the first macro cell 222, the UE 100 determines that the illustrated subframe is not configured as the MBSFN subframe. Then, despite subframes to which the restriction is applied, the UE 100 receives a CRS and performs measurement on a plurality of symbols (e.g., symbols #0, #4, #7, and #11). Accordingly, in this case, the aforementioned accuracy may be satisfied.

In order to achieve this effect, the aforementioned embodiments may be partially modified.

As a first modified embodiment, the serving cell 300 may configure a subframe to which restriction pattern is applied as a normal subframe instead of an MBSFN subframe and add only information of cells in which the normal subframe instead of the MBSFN subframe is configured, to measSubfameCellList. Then, since the subframe to which the restriction is applied is the normal subframe instead of the MBSFN subframe, the UE 100 performs normal measurement in order to measure cells included in measSubfameCellList. In addition, since the subframe to which the restriction is not applied is the MBSFN subframe, the UE 100 performs RSRP/RSRQ measurement using a first CRS.

As a second modified embodiment, as the serving cell 300 configures a subframe to which a restriction pattern is applied as a normal subframe instead of an MBSFN subframe, although an MBSFN-configured cell among neighbor cells is present, the UE 100 assumes the corresponding subframe of the corresponding cell as a normal subframe instead of the MBSFN subframe and performs RSRP/RSRQ measurement.

As a third modified embodiment, the serving cell 300 applies restriction such that the UE 100 performs RSRP/RSRQ only in a normal subframe instead of an MBSFN subframe. In case of FDD, in subframes #0, #4, #5, and #9, only a normal subframe instead of an MBSFN subframe is present. In case of TDD, in subframes #0, #1, #5, and #6, only the normal subframe instead of the MBSFN subframe is present. In this case, the UE 100 performs RSRP/RSRQ measurement only in the normal subframe instead of the MBSFN subframe according to the restriction.

FIG. 24 illustrates an example of a case in which the UE 100 is located in coverage of the pico cell 300 and coverage of the macro cell eNodeB 220.

As seen from FIG. 24, when macro-pico coexist, the macro cell 220 operates a specific subframe as an ABS, a UE measures signal intensity and quality of each cell in the corresponding specific subframe and performs cell selection or cell reselection.

In this case, two scenarios may be considered. According to a first scenario, a serving cell is the macro cell 220 and a neighbor cell is the pico cell 300. According to a second scenario, the serving cell is the pico cell 300 and the neighbor cell is the macro cell 220.

FIG. 24(A) illustrates the first scenario. As illustrated in FIG. 24(A), while communicating with the macro cell 220 as the serving cell and moving toward the pico cell 300, the UE 100 receives a CRS from the macro cell 220 and the pico cell 300, measures RSRP and RSRQ, and lastly, selects or reselects the pico cell 300.

Then, FIG. 24(B) illustrates the second scenario. As illustrated in FIG. 24(B), while communicating with the pico cell 300 as the serving cell and moving toward the macro cell 220, the UE 100 receives a CRS from the macro cell 220 and the pico cell 300, measures RSRP and RSRQ, and lastly, selects or reselects the macro cell 220.

However, in this case, as described above, when a subframe indicated as a measurement target according to measSubframePattern-Serv and measSubframePattern-Neigh is configured as an ASB by the macro cell 220 and does not receive any data, RSRQs measured in the serving cell and the neighbor cell are almost the same such that a cell with excellent RSRQ cannot be identified. As a result, cell selection or cell reselection cannot be accurately performed.

Even if the UE actually measures RSRP/RSRQ of the macro cell 220 in a subframe configured as an ABS by the macro cell 220, an actual service is not performed by the macro cell 220 in the corresponding subframe, and thus, cell selection or cell reselection is meaningless.

Thus, the present invention proposes research into a method for accurately measuring channel quality (e.g., RSRP/RSRQ/RLM) of adjacent cells according to presence of a list of neighbor cells using an eICIC scheme for minimizing interference from adjacent cells in an environment in which multiple cells coexist to extend coverage of pico cell/femto cell or minimizing reception interference of a UE added to a macro cell to provide excellent quality to the UE. In this regard, a measurement method of the UE varies according to presence of the list. In addition, during the eICIC scheme, when there is no information about neighbor cells, channel quality information of all cells needs to be measured in a subframe configured to be restricted according to measurement pattern information of serving cell/neighbor cell, and thus, the amount of information to be measured by the UE is increased. In this case, seamless data transmission may be impossible due to reduction in handover opportunity. Thus, when a cell list is not present, an indicator for differentiating between the pico cell/femto cell and neighbor cells is required. Alternatively, there is a need for an algorithm for differentiating between the pico cell/femto cell and neighbor cells based on basic measurement information.

As described above, in an environment in which multiple cells coexist, in order to minimize interference between adjacent cells, the macro cell and the pico cell/femto cell repeat muting/silencing on a subframe basis according to the pattern information. In this case, channel quality of each cell, received by the UE per subframe, varies according to interference. In particular, in two or three subframes as coherent periods at a low speed, in which a channel is barely changed, a channel coefficient of the channel is constant, generally. However, the macro sell as the serving cell transmits data for various UEs belonging to the macro cell in all subframes using eICIC, a signal of the pico cell overlaps a signal of the macro cell. Thus, quality (e.g., RSRP/RSRQ/RLM) of the pico cell, measured by the UE, is weaker than quality measured in a non-overlapped subframe. When these different values are measured, confusion is caused about selection of information when the corresponding BS schedules resources, and an environment without actual channel change cannot be reported.

Thus, according to the current 3GPP standard, during the eICIC scheme, a measurement pattern for a serving cell and neighbor cells is basically transmitted to a UE, as defined in TS36.331. However, transmission of a corresponding neighbor cell list is determined as optional feature as in existing Rel-8/9. In addition, there is a method for allowing the UE to differentiate between pico cell/femto cell and the macro cell. In this case, the UE needs to perform quality measurements on all cells in a restricted subframe period. However, according to the current 3GPP, measurements requirements are configured to perform muting/silencing in at least one subframe (1 ms) or more in one frame (10 ms), which means that an available period for measurement is reduced to 1/10 compared with Release 8 or Release 9. As defined in TS36.331, measurement needs to be performed on all cells that are actually present around a UE in one subframe (1 ms) as a minimum restricted period in one frame.

To this end, the UE needs to store all information received in the subframe and then to perform measurement on each cell, and thus, the UE needs to allocate more buffers for storing the information, thereby increasing processing power. In addition, it is disadvantageous that reliable measurement report is not transmitted to a BS due to reduction in handover opportunity. Thus, a method for overcoming this problem will be proposed below.

Another problem arises in that the UE cannot identify MBSFN-configured adjacent cells. Thus, the UE does not know presence of a CRS during actual measurement, and thus, the UE performs measurement as cell quality in a lower level or a higher level than an actual situation. In an environment in which a cell in which an MBSFN subframe is configured coexists in neighbor cells, various patterns may be used as the ABS pattern by a current BS, and thus, it is not easy to actually acquire a reasonable cell quality measurement result.

Thus, hereinafter, two methods will be described. A first method is a method for increasing handover opportunity while reducing measurement load when a cell list is not present. A second method is a method for accurately measuring measurement quality in an environment in which adjacent cells are MBSFN-configured. The first method can be obtained via three solutions, which will be described below.

Figure 25:
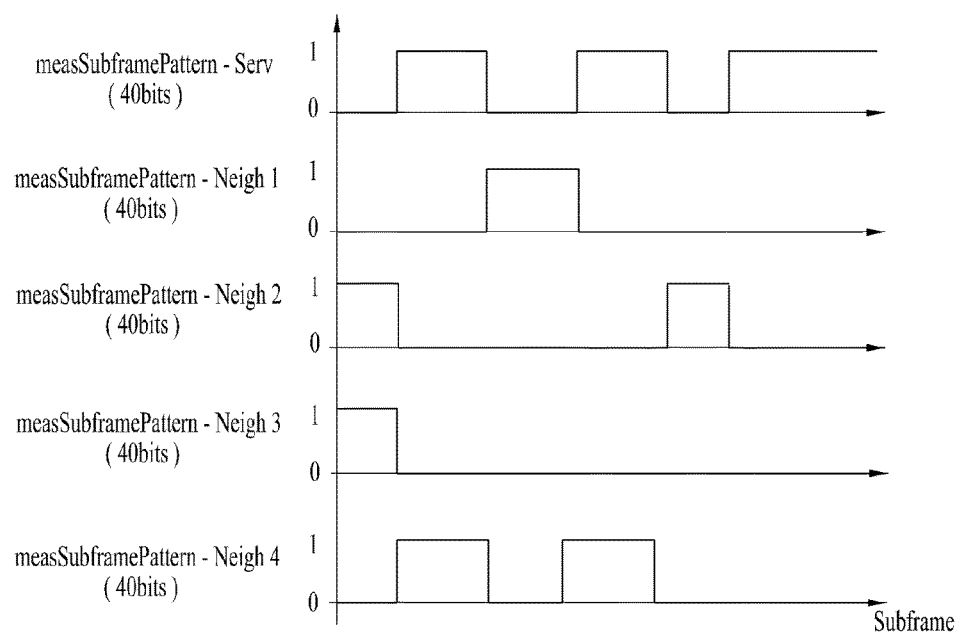
FIG. 25 illustrates an example of a method of configuring different time domain measurement resource restriction patterns for respective neighbor cells among methods for increasing handover opportunity while reducing measurement load when a neighbor cell list is not present.

FIG. 25 illustrates an example of a method of configuring different time domain measurement resource restriction patterns for respective neighbor cells among methods for increasing handover opportunity while reducing measurement load when a neighbor cell list is not present.

As seen from FIG. 25, when a serving cell transmits measurement patterns of neighbor cells to a UE, time domain measurement resource restriction patterns are separately configured for respective neighbor cells.

Various cells may be grouped as pico cells (femto cells)/macro cells or adjacent cells may have independent patterns.

Patterns of neighbor cells may be configured to differentiate between a normal-ABS and an MBSFN subframe. In this case, the UE receives pattern information of a specific cell, thereby reducing measurement load for measuring all adjacent cells in one subframe. In addition, specific patterns for respective neighbor cells may be used, and thus, a UE may be effectively allocated from a scheduler point of view.

That is, as seen from FIG. 25, time domain measurement resource restriction patterns, that is, measSubframePattern of a serving cell, neighbor cell 1, and a neighbor cell 2 are configured in different ways. Referring to FIG. 25, neighbor cell 2 and neighbor cell 3 are grouped to have the same measurement subframe pattern. Likewise, respective cells have different measurement patterns, and thus, the cells using the respective patterns may be used per group or independently. A measurement subframe pattern of neighbor cell 4 is similar to that of the serving cell, for an exceptional situation in which a pattern is insufficient. A neighbor having a similar pattern to the serving cell may be possible when interference is not high.

In order to prevent different measurement results according to subframes measured in an environment without channel variation to acquire different channel qualities, scheduling may be performed to differentiate between a cell conforming to measurement subframe pattern standard of the serving cell and a cell using a subframe except for the measurement subframe pattern of the serving cell. When a cell that is not included in a list is detected, all patterns except for the measurement subframe pattern of the serving cell can be used.

Although not illustrated in FIG. 25, there are two solutions for the first method for increasing handover opportunity while reducing measurement load when a cell list not present, which will be described below.

According to a first solution of the two solutions, a BS informs a UE of an indicator for differentiating between pico cell/femto cell and a macro cell. When this method is used, the UE performs measurement in a subframe in which only pico cells are restricted and performs measurement only in a period of the remaining macro neighbor cells, in which muting is not performed. Thus, it is advantageous that the measured cell quality is maintained, a similar buffer size and processing power to Release 8 or Release 9 of the 3GPP standard can be consumed, and a unique measurement method for eICIC only is not needed. However, it is disadvantageous that, although the quality of the macro neighbor cell is similar to Release 8 or Release 9 of the 3GPP standard, quality is degraded compared with a case in which measurement is performed in a restricted subframe.

According to a second solution of the two solutions, the UE differentiates between the pico cell and the macro cell according to existing measurement result of neighbor cells, performs measurement only in a pico cell in a subframe of a pattern of a neighbor cell, which is transmitted from the BS, and performs measurement in the remaining cells in subframes except for the pattern.

As a method for differentiating between the pico cell and the macro cell, comparison is performed on periods (−4 dB≤RSRQ≤−17 dB) with reasonable RSRQ of all neighbor cells to acquire a threshold. When a cell is alive for a period time shorter than threshold time, the cell is assumed to be the pico cell and measurement is performed. In this case, more excellent detection possibility can be obtained using speed information of the UE based on phase distortion due to the Doppler Effect. When this solution is used, the information needs to be updated every measurement report.

FIG. 26 illustrates an example of the second method for accurately measure measurement quality in an environment in which adjacent cells are MBSFN-configured.

First, a UE does not know whether MBSFN is configured, and thus, the UE receives a CRS in OFDM symbols #0, #4, #7, and #11 and performs measurement as in a conventional method. According to the current method, when an existing UE performs measurement, interference is admitted without change, performance degradation corresponding thereto is endured.

Referring to FIG. 26(A), an ABS pattern is represented in 8 bits, each of which indicates a subframe configured as an ABS. In this case, the ABS pattern indicates one subframe per 8 subframes as the ABS subframe. A measurement subframe pattern (measSubframePattern-Neigh) of a neighbor cell is a subframe to be measured and indicates subframe #0 and subframe #8 in a first subframe, subframe #6 in a second subframe, subframe #4 in a third subframe, and subframe #2 in a fourth subframe.

In this case, since subframes #0, #4, #5, and #9 are not configured as an MBSFN subframe, four CRSs, that is, all four OFDMs can be used. On the other hand, only one OFDM can be used in another frame.

The sufficient number of OFDM symbols for measurement in subframe #0 is 4 and the insufficient number is 0. On the other hand, the sufficient number of OFDM symbols for measurement in subframe #6 is 1, and thus, the insufficient number is 3.

When the UE performs measurement according to the pattern illustrated in FIG. 26(A), garbage symbols are 9/20 all symbols, and actually available CRSs are 11/20 only. Thus, needless to say, performance degradation corresponding thereto is expected. However, when performance requirements are designed in consideration of admitted interference due to adjacent cells and performance degradation corresponding thereto, it is difficult to obtain the performance requirements.

Referring to FIG. 26(B), an ABS pattern is represented in 8 bits, each of which indicates a subframe configured as an ABS. In this case, the ABS pattern indicates two subframes per 8 subframes as ABS subframes.

Referring to FIG. 26(C), it is assumed that all subframes are MBSFN-ABSs without differentiating between a normal ABS and an MBSFN ABS and are configured such that a BS uses a measurement pattern only for a pure CRS.

Thus, when subframes are configured such that an adjacent neighbor cell and a serving cell are synchronized with each other, if an MBSFN-ABS pattern is formed so as to use only subframes #0, #4, #5, and #9 that cannot be configured as an MBSFN subframe because subframes #0, #4, #5, and #9 carry BCH/PSCH/SSCH and paging signals. Thus, a measurement pattern given by the BS includes subframes #0, #4, #5, and #9 only. In this case, accurate radio resource management (RRM) measurement may be possible.

As illustrated in FIG. 26(C), on the assumption that all subframes are MBSFN-ABSs, all the ABS/MBSFN subframes can be used, and excellent performance for measurement can be obtained compared with FIG. 26(A). However, it is disadvantageous that a measurement pattern available in eICIC is restrictive. In addition, in a real network as an asynchronous environment in which subframe offset is present, FIG. 26(A) is different from FIG. 26(C) in that interference is added to patterns as in FIG. 26(A), but it is difficult to measure only a pure CRS.

However, when a TDD system as a synchronous case is assumed, this method can obtain excellent performance. Thus, the present invention proposes a method of performing various measurements simply using a pattern formed in consideration of subframes #0, #4, #7, and #11 that cannot be configured as an MBSFN subframe in all cases irrespective of normal ABS/MBSFN ABS subframe configuration in a synchronous system in which subframe offset is not present, such as a TDD environment.

Figure 27:
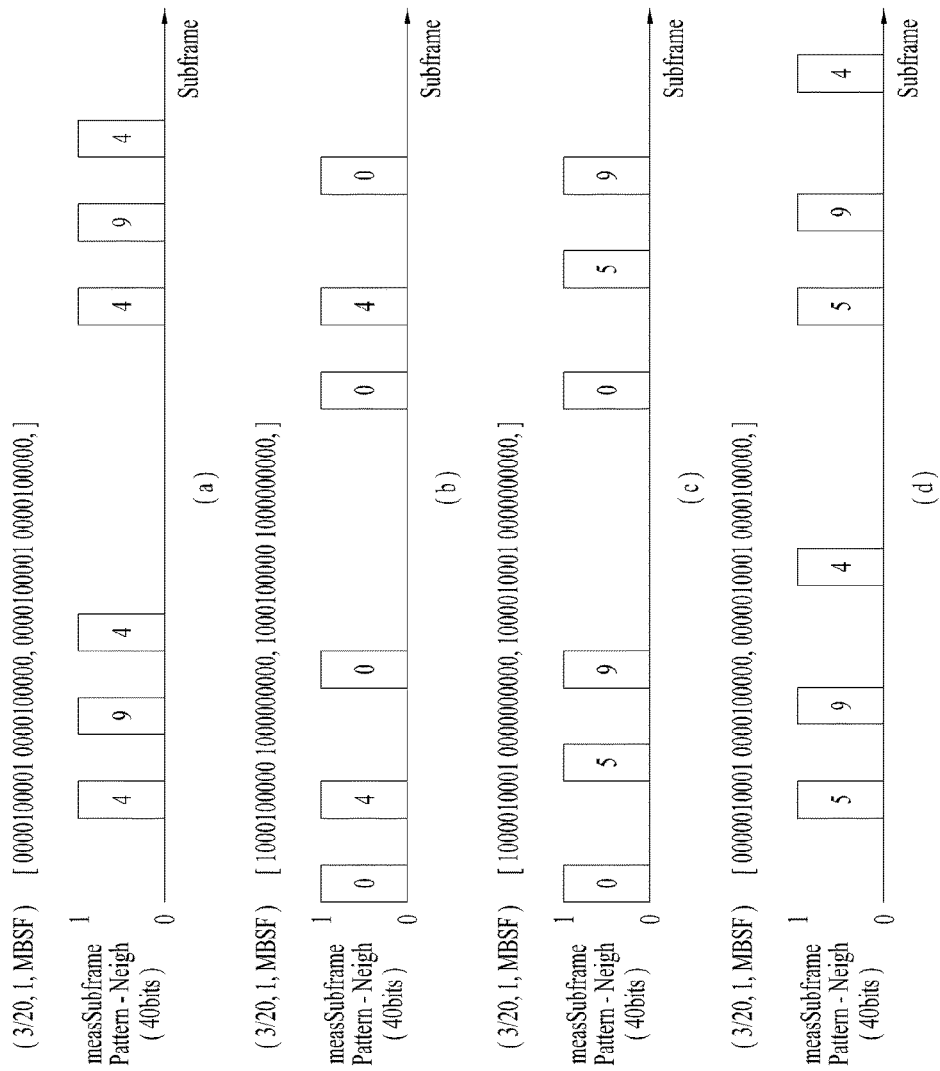
FIG. 27 illustrates another example of the second method for accurately measure measurement quality in an environment in which adjacent cells are MBSFN-configured.

For example, a subframe pattern in an example (example 3/20) in which three subframe per 20 subframes are configured as MBSFN subframes is further proposed as illustrated in FIG. 27. Other various patterns can be formed within 40 bits.

FIG. 27 illustrates another example of the second method for accurately measure measurement quality in an environment in which adjacent cells are MBSFN-configured.

FIG. 27 illustrates examples of various measurement patterns using subframes #0, #4, #5, and #9 when only an MBSFN pattern is used in all ABS/MBSFN subframes.

FIG. 27(A) illustrates an example in which a measurement subframe pattern for a neighbor cell is configured through subframes #4 and #9 when three MBSFN subframes per 20 subframes are configured.

FIG. 27(B) illustrates an example in which a measurement subframe pattern for a neighbor cell is configured through subframes #0 and #4 when three MBSFN subframes per 20 subframes are configured.

In addition, FIG. 27(C) illustrates an example in which a measurement subframe pattern for a neighbor cell is configured through subframes #0, #4, and #9 when three MBSFN subframes per 20 subframes are configured.

Lastly, FIG. 27(D) illustrates an example in which a measurement subframe pattern for a neighbor cell is configured through subframes #4, #5, and #9 when three MBSFN subframes per 20 subframes are configured.

Although not illustrated, another example of the second method for accurately measure measurement quality in an environment in which adjacent cells are MBSFN-configured will be described below.

According to the current method, an indication bit may be added to every adjacent cell such that a BS informs a UE of an MBSFN indicator for each neighbor cell. In this case, in case of a normal ABS, the UE uses all subframes #0, #4, #7, and #11, and in case of MBSFN configuration, the UE performs measurement using subframe #0 only and calculates more averages to increase accuracy. When this method is used, RRM requirements needs to be configured according to the normal ABS or the MBSFN ABS with regard to requirements for RSRP/RSRQ.

FIG. 28 illustrates further another example of the second method for accurately measure measurement quality in an environment in which adjacent cells are MBSFN-configured.

According to the current example, in a real network as an asynchronous method, such as an FDD, all neighbor cells present around a serving cell at an absolute point of time for indicating a measurement pattern for a neighbor cell in a network may be mandatorily configured as a normal subframe in order to use all four CRSs irrespective MBSFN subframe configuration during RRM measurement of neighbor cells. In this case, the UE assumes that all neighbor cells are configured as a normal subframe, receives symbols #0, #4, #7, and #11 only at the absolute point of time, and performs RRM measurement.

That is, as illustrated in FIG. 28(A), when 17 MBSFN subframes are configured among 20 subframes, subframes #0 and #5 may be configured using a measurement pattern in a neighbor cell, pico cell, as illustrated in FIG. 28(B).

As illustrated in FIG. 28(C), subframes #2 and #7 that can be configured as an MBSFN-ABS subframe are configured as a normal subframe by a network, and thus, all four CRSs can be used for RRM.

As described above, the present invention proposes three methods for effectively performing measurements of RSRP/RSRQ/RSSI according to presence of a cell list by a UE in a network environment during inter-cell interference coordination (ICIC). According to the three methods, various measurements can be effectively performed without increase in load of the UE and implementation complexity. In addition, when an MBSFN subframe is configure in neighbor cells. In this regard, in a synchronous system such as a TDD system, on the assumption that all neighbor cells are MBSFN subframes, a method for forming a pattern using subframes #0, #4, #5, and #9 to perform various measurements and various patterns at 3/20 have been proposed. In addition, in an asynchronous environment such as an FDD, a method for configuring subframes of all neighbor cells present in a serving cell at an absolute point of time according to a measurement pattern of a neighbor cell as a normal ABS subframe by a network to use four CRSs has been proposed.

The embodiments of the present invention may be achieved by various means, for example, hardware, firmware, software, or a combination thereof.

In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Figure 29:
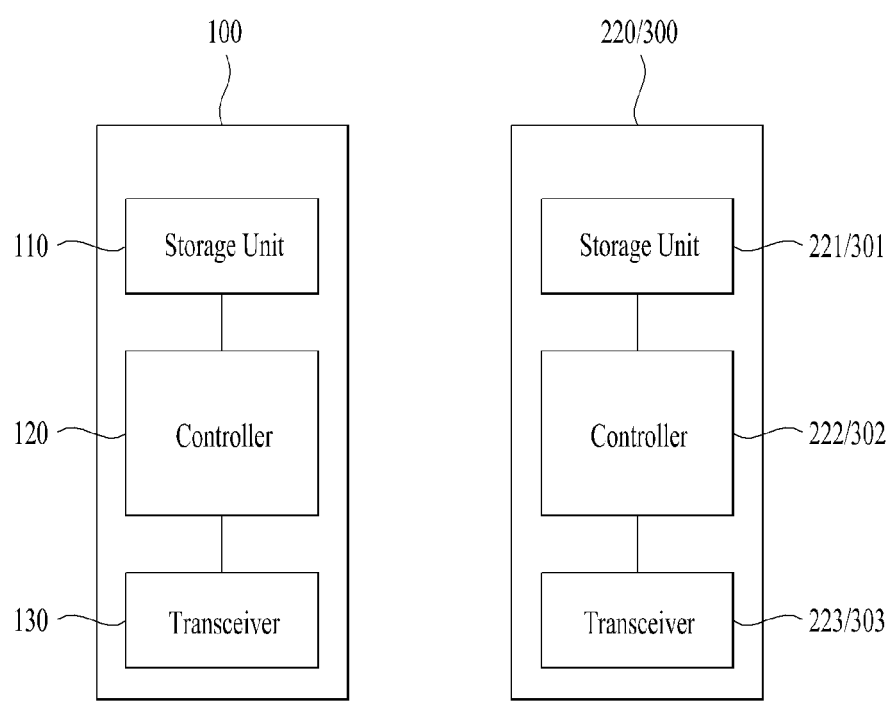
FIG. 29 is a block diagram of the structure of a UE and a BS.

FIG. 29 is a block diagram of the structure of the UE 100 and a BS 220/300.

As illustrated in FIG. 29, the UE 100 includes a storage unit 110, a controller 120, and a transceiver 130. The BS 220/300 is a macro BS or a pico/femto BS and includes a storage unit 221/301, a controller 222/302, and a transceiver 223/303.

The storage units 110 and 221/301 store the methods shown in FIGS. 10 to 23. The transceivers 130 and 223/303 transmit and receive the aforementioned signals.

The controllers 120 and 222/302 control the storage units and the transceivers. In detail, the controllers execute the method stored in the storage units.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The present invention is applicable to a user equipment (UE), a base station (BS), or other equipments in a wireless mobile communication system.

The invention claimed is:

1. A cell measuring method of a user equipment (UE), the method performed by the UE and comprising:
receiving, from a serving cell, first pattern information for measurement on a first neighbor cell which is synchronous with the serving cell;
receiving, from the serving cell, second pattern information for measurement on a second neighbor cell which is asynchronous with the serving cell,
wherein the first pattern information indicates a first subframe pattern which is configured as a non-multimedia broadcast over single frequency network (non-MBSFN) subframe pattern for the first neighbor cell,
wherein the second pattern information indicates a second subframe pattern which is configured as a non-MBSFN subframe pattern for the second neighbor cell, and
wherein the second subframe pattern is a subframe pattern in which the first subframe pattern is shifted by a predetermined subframe;
receiving a plurality of cell-specific reference signals (CRSs) from the first neighbor cell and the second neighbor cell based on the same non-MBSFN subframe pattern; and
performing measurement on the first neighbor cell and the second neighbor cell using the plurality of CRSs.

2. The method according to claim 1, wherein the measurement on the first neighbor cell and the second neighbor cell is performed using symbols #0, #4, #7 and #11 of the same non-MBSFN subframe pattern.

3. The method according to claim 1, wherein a subframe of the serving cell corresponding to a subframe configured as a non-MBSFN subframe for the first neighbor cell is configured as an MBSFN subframe.

4. A user equipment (UE) for performing cell measurement, the UE comprising:
a receiver; and
a processor,
wherein the processor configured to
control the receiver to receive, from a serving cell, a first pattern information for measurement on a first neighbor cell which is synchronous with the serving cell,
control the receiver to receive, from the serving cell, second pattern information for measurement on a second neighbor cell which is asynchronous with the serving cell, wherein the first pattern information indicates a first subframe pattern which is configured as a non-multimedia broadcast over single frequency network (non-MBSFN) subframe pattern for the first neighbor cell,
wherein the second pattern information indicates a second subframe pattern which is configured as a non-MBSFN subframe pattern for the second neighbor cell, and
wherein the second subframe pattern is a subframe pattern in which the first subframe pattern is shifted by a predetermined subframe,
control the receiver to receive a plurality of cell-specific reference signals (CRSs) from the first neighbor cell and a second neighbor cell based on the same non-MBSFN subframe pattern, and
perform measurement on the first neighbor cell and the second neighbor cell using the plurality of CRSs.

* * * * *